United States Patent
Weiss

(10) Patent No.: US 7,433,742 B2
(45) Date of Patent: Oct. 7, 2008

(54) CONTROL OF ITEMS IN A COMPLEX SYSTEM BY USING FLUID MODELS AND SOLVING CONTINUOUS LINEAR PROGRAMS

(76) Inventor: Gideon Weiss, Morad Hayasmin 2, Haifa 34762 (IL)

( * ) Notice: Subject to any disclaimer, the term of this patent is extended or adjusted under 35 U.S.C. 154(b) by 584 days.

(21) Appl. No.: 11/118,169

(22) Filed: May 2, 2005

(65) Prior Publication Data
US 2006/0015309 A1  Jan. 19, 2006

Related U.S. Application Data

(62) Division of application No. 10/206,188, filed on Jul. 26, 2002, now Pat. No. 6,922,593.

(51) Int. Cl.
*G05B 13/02* (2006.01)
(52) U.S. Cl. ................ 700/28
(58) Field of Classification Search ........ 700/28–32
See application file for complete search history.

(56) References Cited

U.S. PATENT DOCUMENTS

| | | | |
|---|---|---|---|
| 5,621,654 A | 4/1997 | Cohen et al. | |
| 5,671,361 A | 9/1997 | Brown et al. | |
| 5,818,716 A | 10/1998 | Chin et al. | |
| 6,317,058 B1 | 11/2001 | Lemelson et al. | |
| 6,317,682 B1 | 11/2001 | Ogura et al. | |
| 6,334,089 B2 | 12/2001 | Hessing | |
| 6,339,697 B1 | 1/2002 | Ranta | |
| 6,438,436 B1 | 8/2002 | Hohkibare et al. | |
| 6,459,950 B1 | 10/2002 | Kawazome | |
| 2002/0070937 A1* | 6/2002 | Bertram et al. | 345/440 |
| 2005/0119928 A1* | 6/2005 | Deitrich et al. | 705/9 |

OTHER PUBLICATIONS

This is division of U.S. Appl. No. 10/206,188, filed Jul. 26, 2002.
R. Bellman "Bottleneck problems and dynamic programming" Proceedings of the National Academy of Science of the USA, vol. 39 pp. 947-951, 1953.
E.J. Anderson "A new continuous model for job shop scheduling" International Journal of Systems Science, vol. 12 pp. 1469-1475, 1981.
M. Pullan "An algorithm for a class of continuous linear programs" SIAM Journal of Control and Optimizations, vol. 31, pp. 1558-1577, 1993.
G. Weiss "Scheduling and control of manufacturing systems—a fluid approach" Proceedings of the 37 Allerton Conference, Sep. 22-24, Allerton, Monticello, Illinois, 1999.

* cited by examiner

*Primary Examiner*—Albert DeCady
*Assistant Examiner*—Chad Rapp

(57) ABSTRACT

A method and apparatus for the control of a system comprising of a plurality of items through the scheduling of actions and the allocation of resources is disclosed. Primary areas of utility include manufacturing systems, city wide vehicle traffic control, multiple project scheduling, communications networks and economic systems. The method and apparatus comprise modeling the parts in such a system as fluid, formulating the control problem as a continuous linear program, using a novel algorithm to solve it, displaying the fluid solution in a meaningful way, and using the fluid solution in the control of the system.

2 Claims, 11 Drawing Sheets

Apparatus for Fluid Control of a System

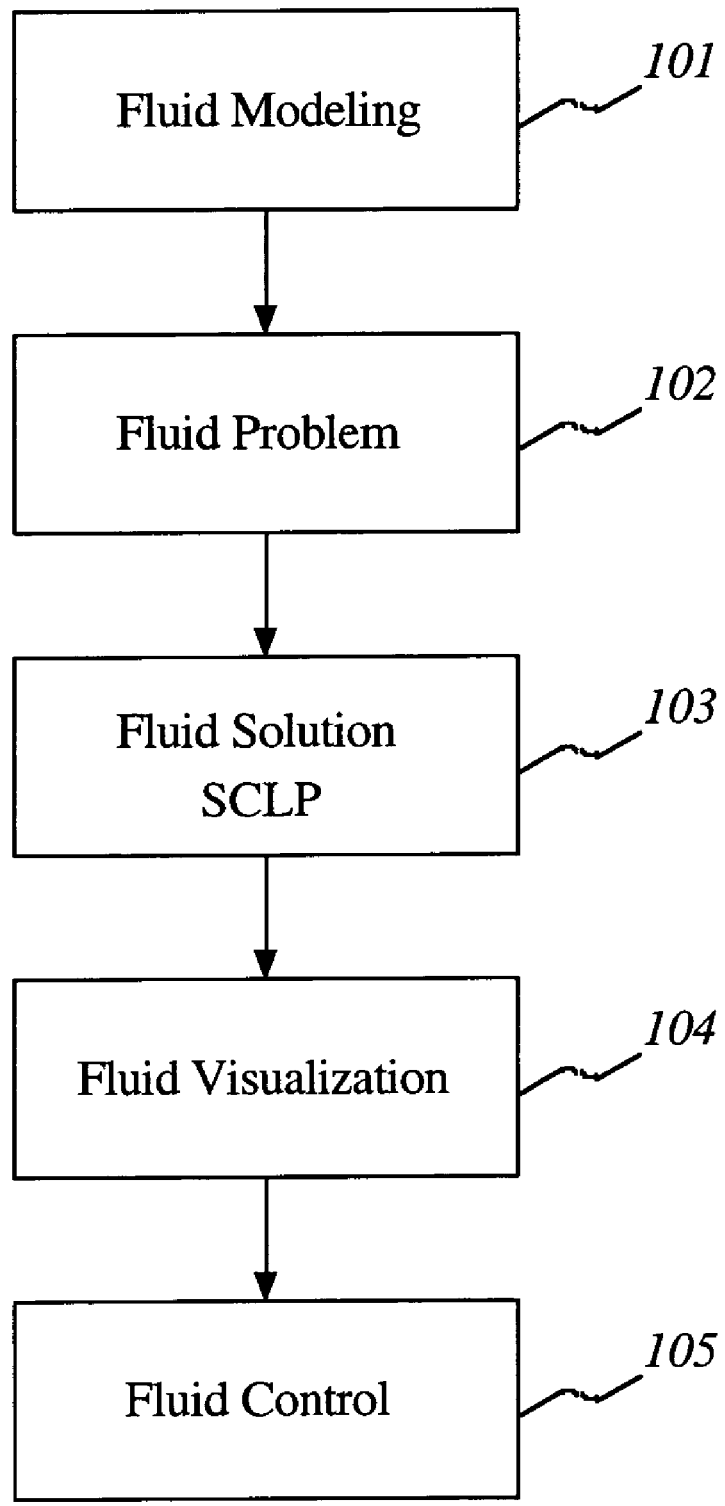
*FIG. 1* Fluid Control of a System

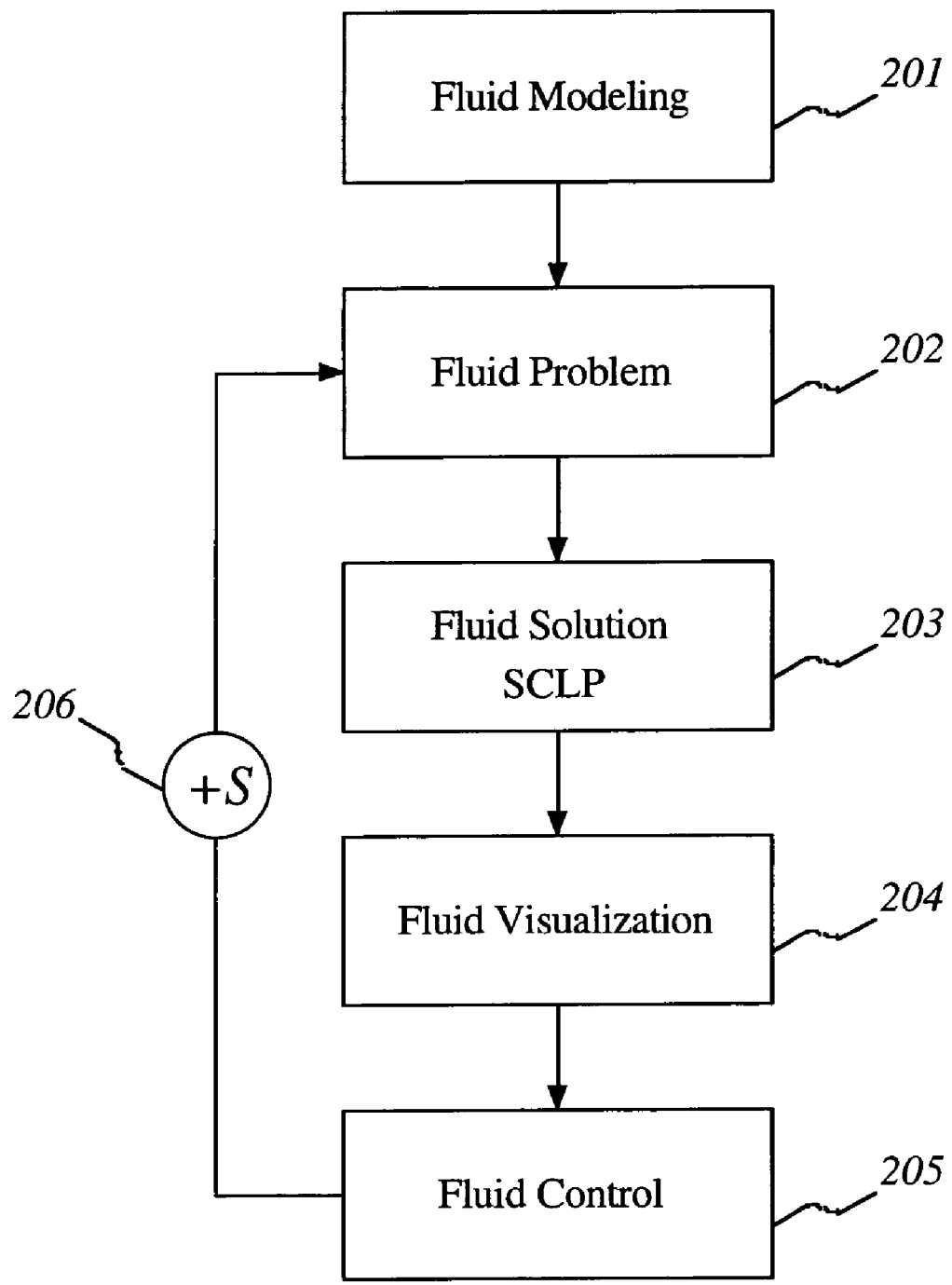
FIG. 2  Closed Loop Control at S Intervals

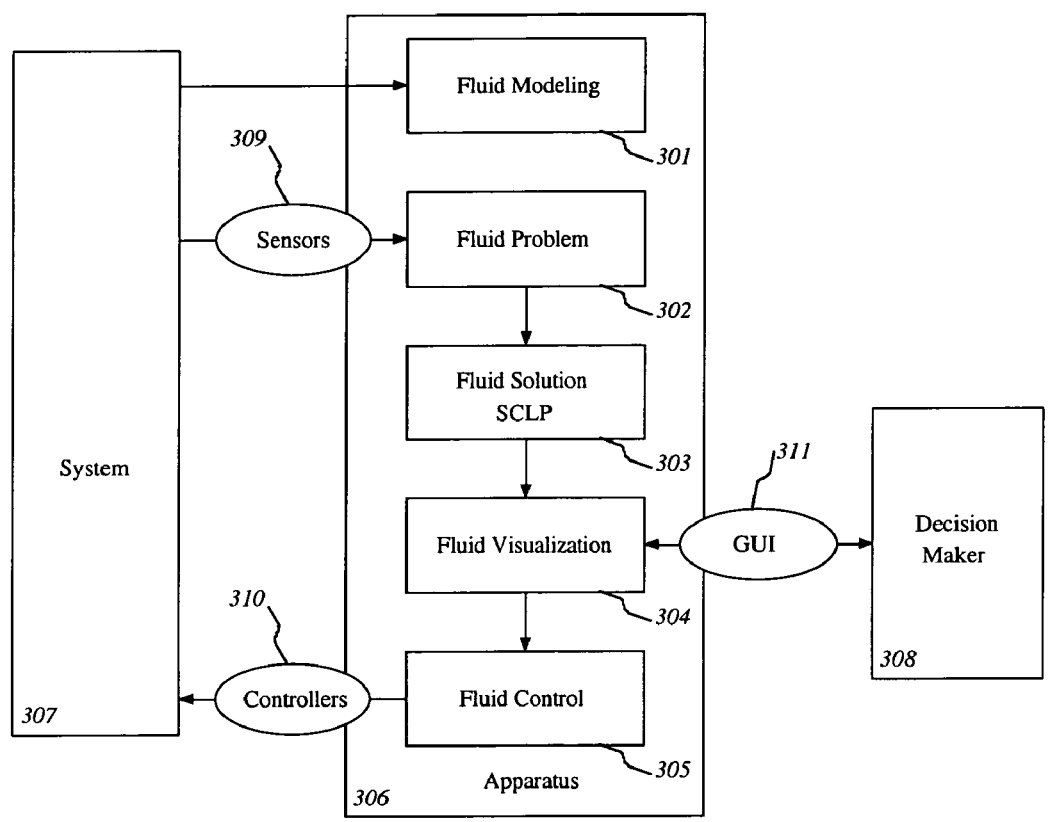
*FIG. 3*  Apparatus for Fluid Control of a System

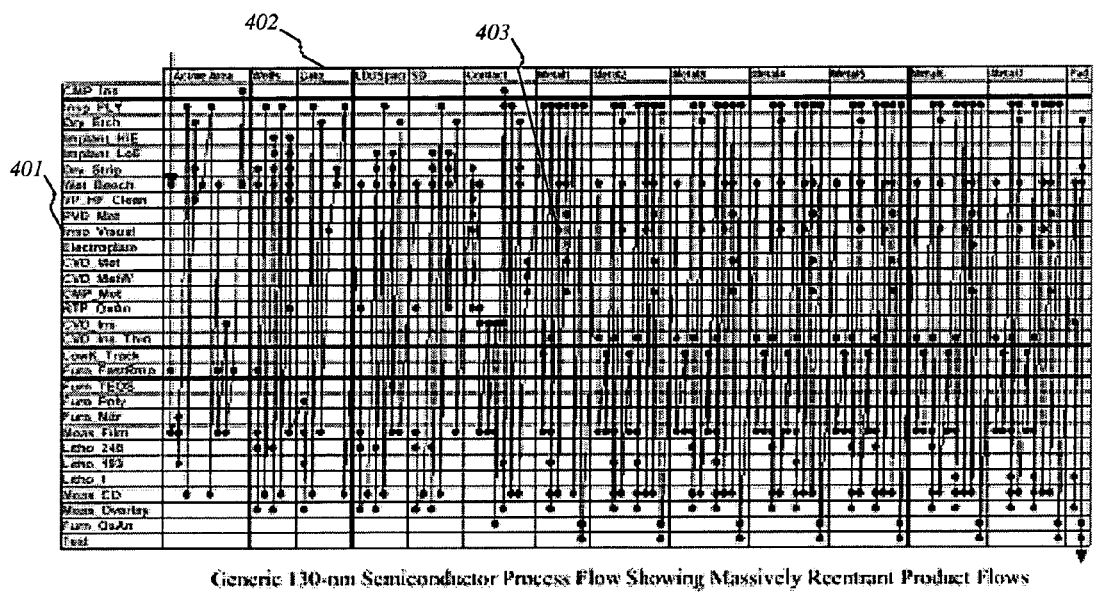
FIG. 4 Example of a Re-Entrant Line Manufacturing System

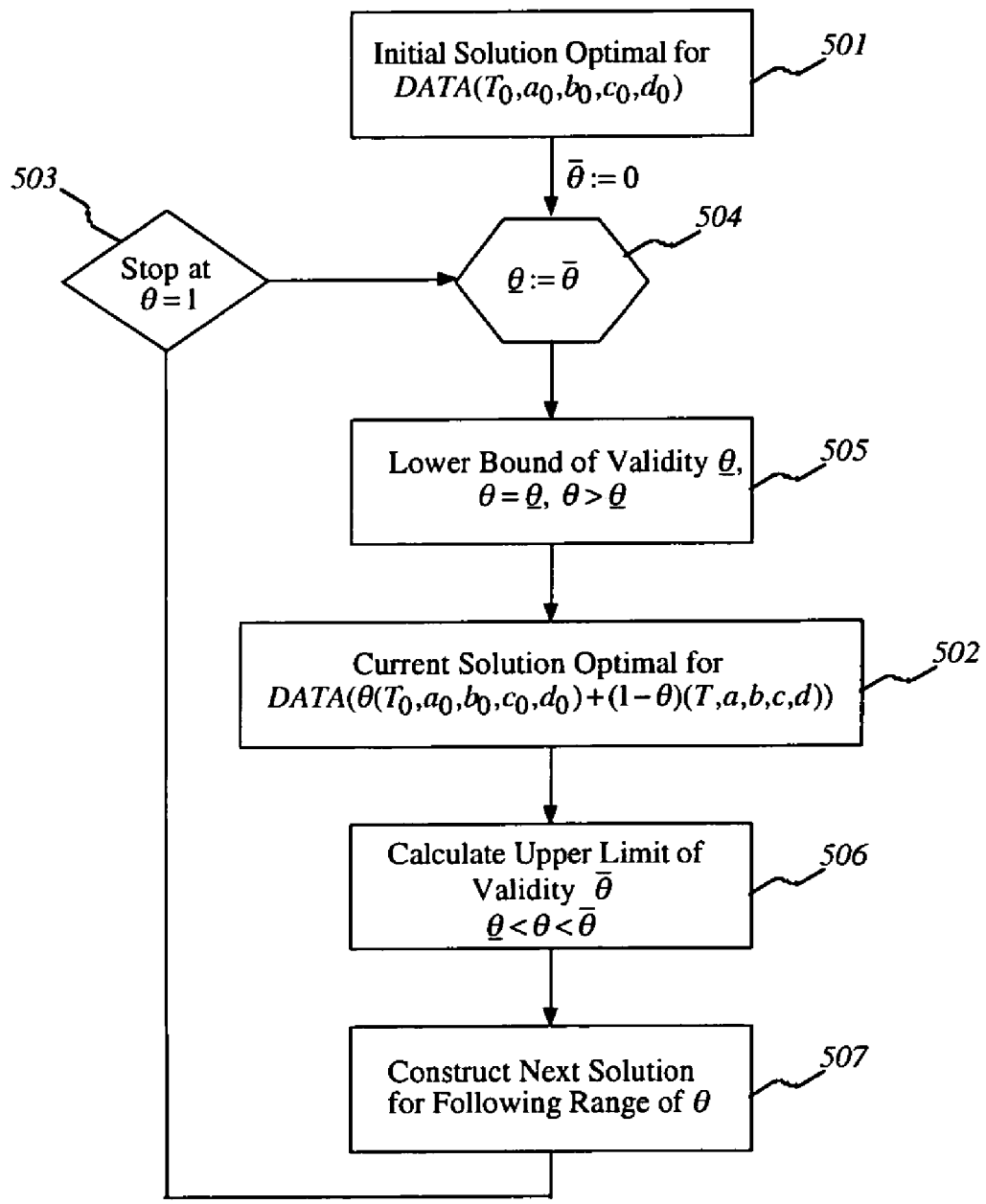
FIG. 5 Flow Chart for General SCLP Algorithm

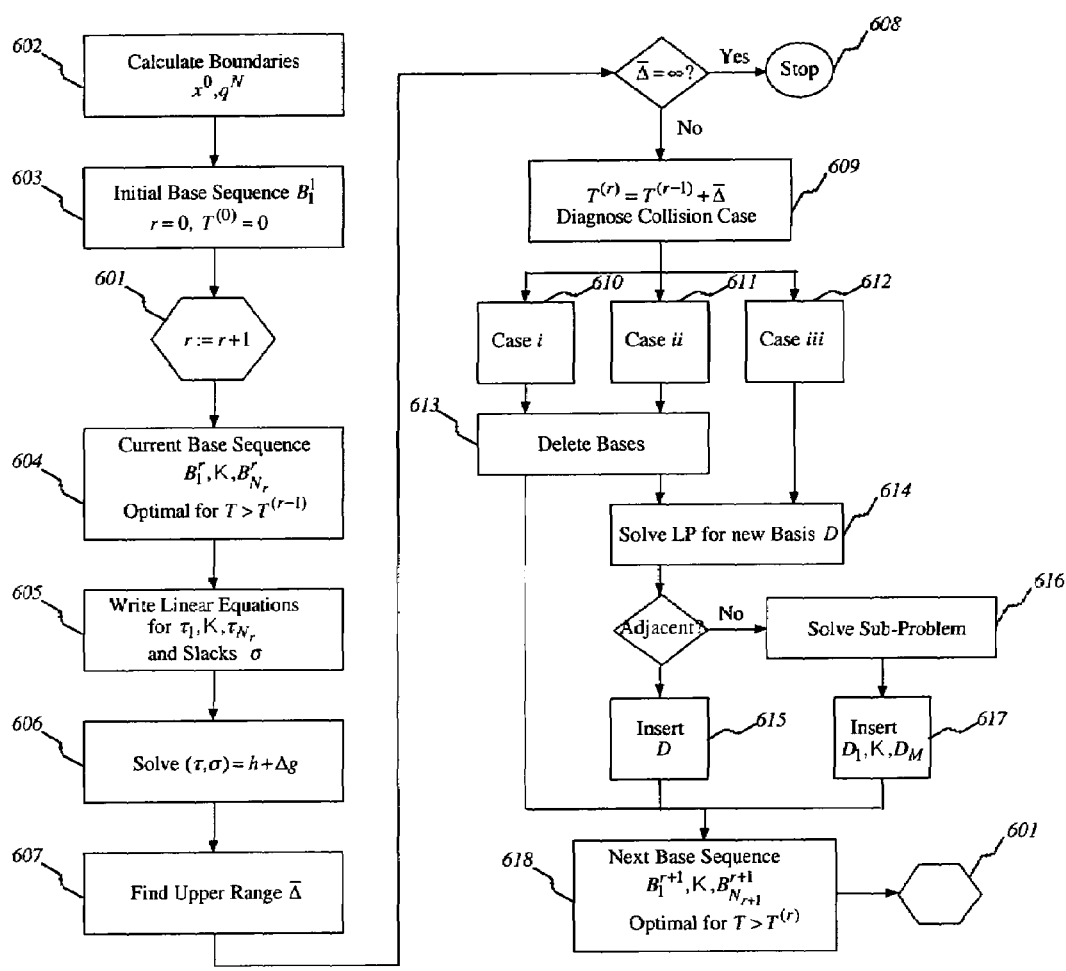
FIG. 6  Flow Chart for SCLP Algorithm with Linear Data

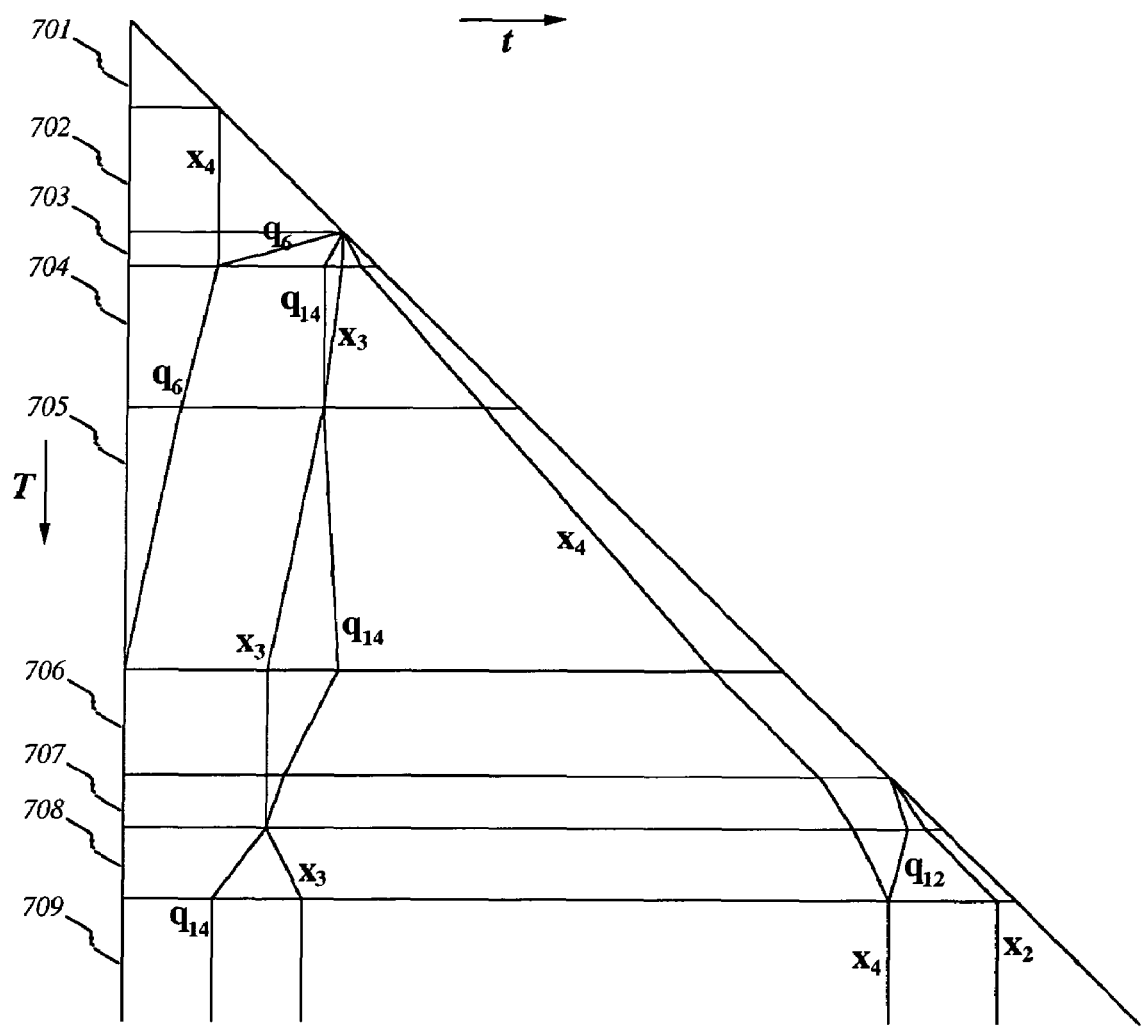
FIG. 7 Evolution of SCLP Solution over all Time Horizons

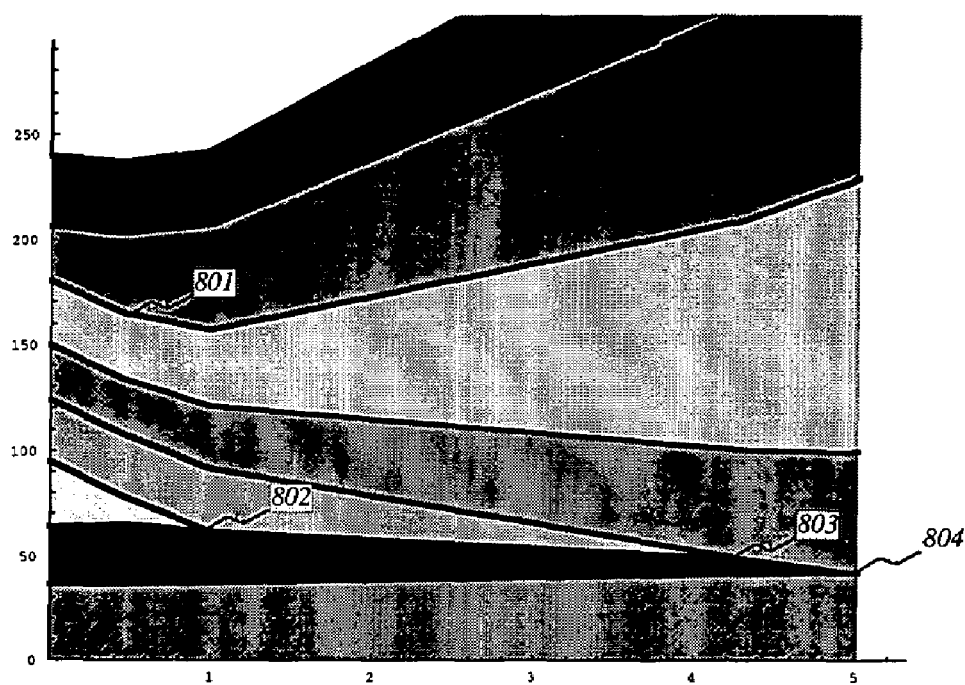
*FIG. 8* Solution of Economic Input Output Model Example, for Infinite Horiozn
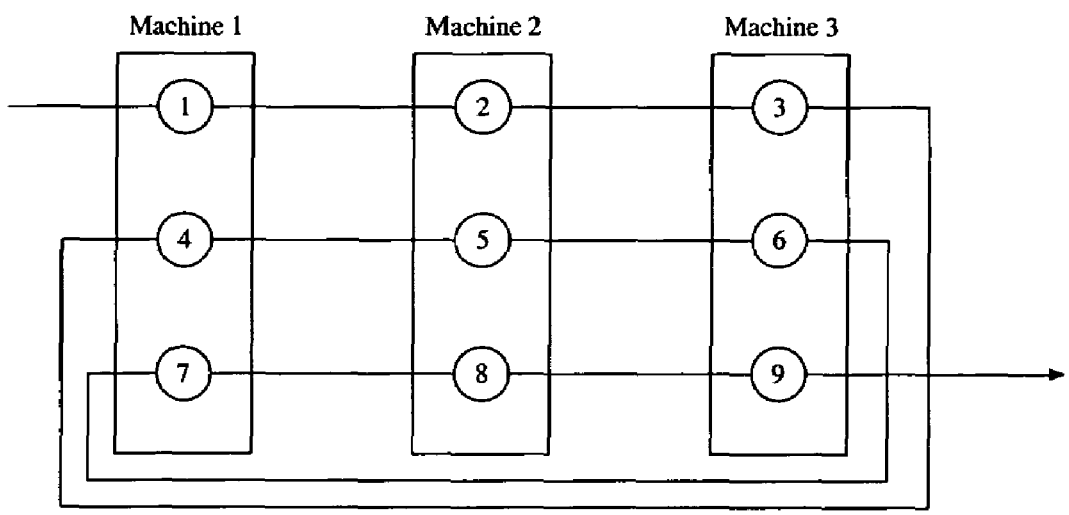
*FIG. 9* Schematic Reentrant Line with 3 Machines, 9 Buffers

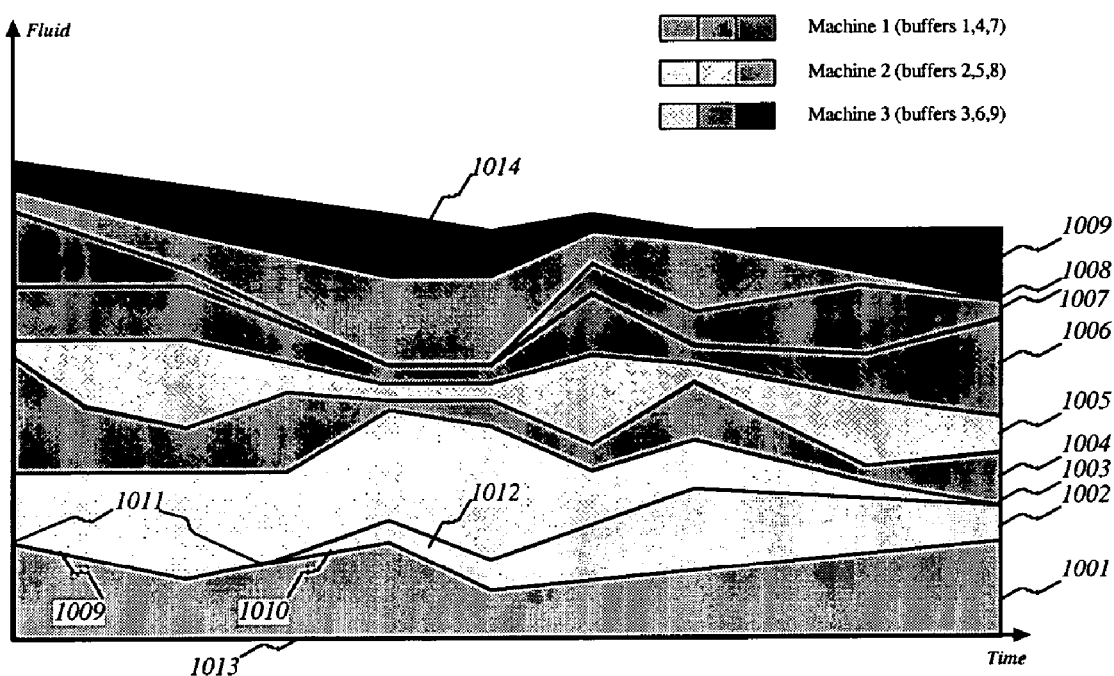
FIG. 10 Graphic Display of Fluid Solution Showing Fluid Levels of the 9 Buffers

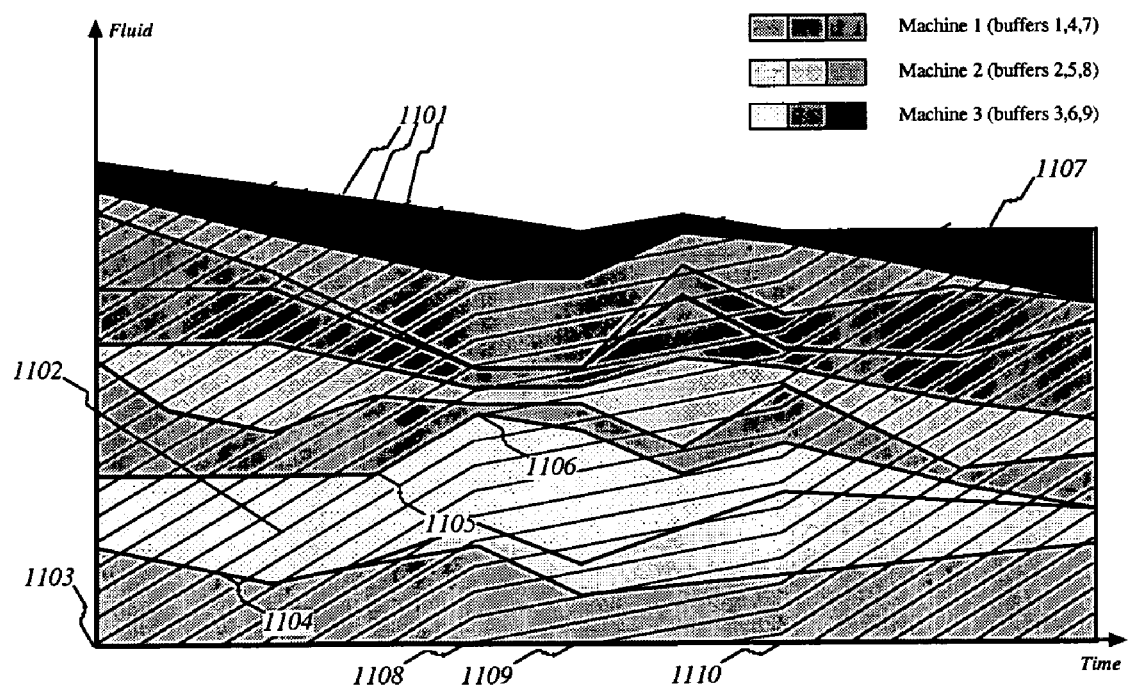
FIG. 11 Graphic Display of Fluid Solution with Horizontal Lines for Sampled Parts

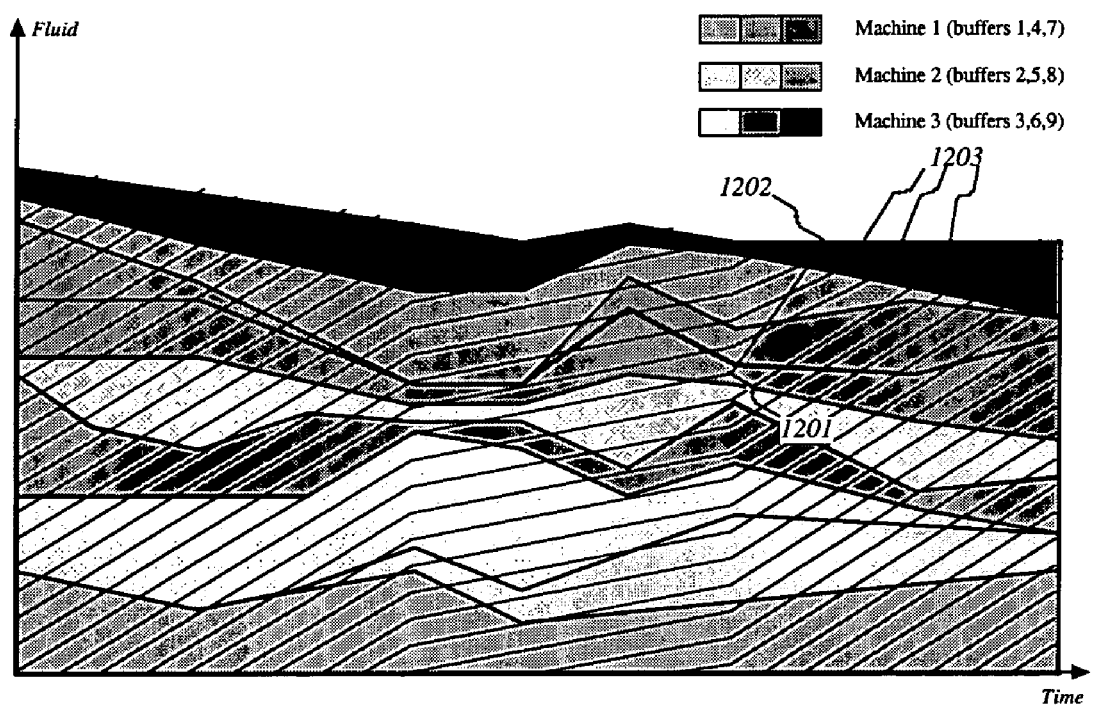
FIG. 12 Graphic Display of Fluid Solution with One Expedited Part

CONTROL OF ITEMS IN A COMPLEX SYSTEM BY USING FLUID MODELS AND SOLVING CONTINUOUS LINEAR PROGRAMS

CROSS REFERENCE TO RELATED APPLICATION

This is division of application Ser. No. 10/206,188 Filed 2002 Jul. 26 now U.S. Pat. No. 6,922,593.

SEQUENCE LISTING OR PROGRAM

This application contains a listing of a computer program to run a novel algorithm which solves continuous linear programs. The listing is contained on compact discs in duplicate. Each of the identical duplicate compact discs contains a single file. The file name is SCLP GW1.TXT, the file size is 78,207 bytes.

TECHNICAL FIELD

This invention relates generally to the field of operations research and systems engineering and more particularly to the control of a system comprising of a large number of items by scheduling the allocation of resources to said items.

BACKGROUND OF THE INVENTION

The need to control systems comprising many items, where each item requires scheduling of actions and allocation of resources over time, arises in a variety of technological, industrial, and economic areas.

In a manufacturing plant production of parts requires the scheduling of operations by the allocation of machines.

In a city traffic system, vehicles require the use of roads and intersections to proceed from source to destination.

In a communication network, messages require bandwidths and buffer storage for transmission between nodes.

In multi-project scheduling one needs to allocate shared resources and determine timing of activities.

In an economic system availability of inputs and demand for outputs have to be matched by scheduling and allocation of production capacity.

Methods used to control such systems are mostly of two kinds: Some are concerned with local optimization of a small part of the system, others, which view the whole system are ad-hoc methods, which are unable to find optimal solutions. One technique which is commonly used to model such systems is simulation, in which the predicted behavior of the system over time for a particular choice of the controls is calculated. This method is slow, cumbersome, and expensive. Simulation is also used to explore various alternative control choices, in order to choose a good one. However, owing to the complexity of said systems, this method cannot find optimal controls.

What is needed is a general unified method for the control of systems as described above, which models the system as a whole, and which optimizes the whole system.

There are two broad theoretical approaches to these control problems: Formulation of the problem for a finite time horizon as a detailed discrete optimization problem, and formulation of an infinite horizon steady state stochastic optimization problem. Both approaches are often inadequate to handle problems of the size that arises in practice. Furthermore, each approach has a grave conceptual fault: In a finite horizon detailed discrete optimization one needs to use precise data for the entire time horizon, whereas in reality only data of the current state is accurate. As a result the quality of the derived controls degrades with time. Optimization of the steady state of a stochastic system assumes that the system operates under stationary conditions long enough to reach a steady state, and this is almost never the case.

What is needed is a method which takes the middle way between the two approaches, by optimizing the system over a finite time horizon, where only on-line decision rules are considered, wherein such on-line decision rules are characterized by the fact that they use the state of the system at the decision moment, and $d_0$ not require detailed information for the whole time horizon.

One approach which has not been used in the control of said systems is Continuous Linear Programming.

Continuous Linear Programming (CLP) problems were introduced by Richard Bellman in 1953, in his paper "Bottleneck problems and dynamic programming", *Proceeding of the National Academy of Science* 39:947-951, in the context of economic input output systems. E. J. Anderson introduced in his 1981 paper "A new continuous model for job-shop scheduling" *International Journal of Systems Science* 12:1469-1475, a sub-class of CLP, which he called Separated Continuous Linear Programming (SCLP) problems, in the context of job shop scheduling. Major progress in the theory of SCLP was achieved by M. C. Pullan in his paper "An algorithm for a class of continuous linear programs" *SIAM Journal of Control and Optimization* 31:1558-1577, and in subsequent papers, in which he formulated a dual problem and proved strong duality under some quite general assumptions. However, research to date has failed to produce efficient algorithms for the solution of CLP and SCLP problems. The main difficulty in finding an efficient algorithm is that candidate solutions as well as the optimal solution are functions of time, which have an infinite uncountable number of values for a continuum of times. What is lacking in the prior art is a concise finite description of such functions.

The prior art method to solve CLP or SCLP is to discretize the problem, so as to obtain an approximation by a standard linear program, which is then solved by a standard linear programming algorithm. This method is far from satisfactory for the following three reasons: First, it does not give an exact solution. Second, the resulting linear program is very large. Third, the solution of the linear program, by its discrete nature, obscures many important features of the optimal solution of the CLP or SCLP. As a result of these three shortcomings, only small problems can be solved, and the quality of the solution is poor.

Lack of an efficient algorithm for CLP or SCLP is the reason that continuous linear programming models have not been used until now to control complex practical systems. What is needed is an efficient and accurate algorithm for the solution of CLP and SCLP.

Graphical representations have always been of extreme importance for decision makers.

An example of this is the Gantt Chart, for job-shop scheduling, introduced by Henry Laurence Gantt during first world war and still used today. The use of computers to display such graphics has greatly enhanced their effectiveness. Furthermore, they can often be used interactively through a graphic user interface (GUI). There is currently no such graphic representation which is used in the control of said systems. What is needed is a graphic representation which gives in a single view a complete picture of the whole system over the whole time horizon of operation.

Close theoretical connections have been established between some fluid models and the behavior of stochastic systems comprising a plurality of items, see J. G. Dai "On positive Harris recurrence of multi-class queueing networks, a unified approach via fluid limit models" *Annals of Applied Probability* 5:49-77, 1995, and S. P. Meyn "The policy improvement algorithm for Markov decision processes with general state space", *IEEE Transactions on Automatic Control* AC-42:191-196, 1997. These results provide some theoretical motivation for the use of fluid models. What is needed is a method to translate fluid models into actual controls of a real system.

OBJECTS AND ADVANTAGES

Accordingly, several objects and advantages of my invention are:

It provides a general unified method for the control of systems as described above, which models the system as a whole, and which optimizes the whole system.

It provides a method which takes the middle way between the approach of finite horizon discrete optimization and of steady state stochastic optimization, by optimizing the system over a finite time horizon, and using only on-line decision rules, where such on line decision rules use the state of the system at the decision moment, but do not require detailed information for the whole time horizon.

It provides means to model the real system by a conceptual fluid system, and for formulating the problem of optimal control of the fluid system as a Separated Continuous Linear Program (SCLP).

It provides the first exact, finite, and efficient algorithm for the solution of SCLP. The algorithm is based on my discovery of a concise finite way to represent candidate solutions of SCLP and to represent optimal solutions of SCLP.

It provides a graphic visual display of the operation of the system, that can be used in design, planning, forecasting, performance evaluation, and control of the real system.

It provides method and apparatus for using the optimal fluid solution of the SCLP for the control of the real system.

Further objects and advantages of my invention will become apparent from a consideration of the drawings and ensuing description.

SUMMARY OF THE INVENTION

The present invention comprises method and apparatus for operation and control of a real system over time. Said real system comprises a plurality of items, each of said items evolving in a continuous plurality of times, where at each of said times each of said items is in one of a plurality of classes. Said real system also comprises a plurality of actions, so that applying one of said actions to one of said items in one of said classes at one of said times will change the class of the item. Said system also comprises a plurality of resources, which are consumed by the application of each of said actions. The operation and control of the system comprise timing of said actions and allocation of said resources to said actions. The said method and apparatus optimize the operation and control of the system, by maximizing a plurality of rewards accrued by the system over time.

A first embodiment of the method is drawn schematically in FIG. 1, and comprises the following five steps:

(a) Modeling the real system by a fluid-model system 101, comprising the following elements:

State of the fluid-model system is given by levels of fluids in buffers as a function of time, where the fluid in a buffer at time t approximates the number of items in a corresponding class in the real system around the time t.

Controls of the fluid-model system are given by flow rates as a function of time where a flow rate at time t represents the number of applications of a corresponding action in the real system around the time t.

A linear relationship between the flow rates and the rates of change of the state of the fluid-model system at time t.

A linear relationship between the flow rates of the fluid-model system at time t and the rate of consumption of resources.

(b) Formulating an SCLP Optimization Problem for the Fluid-Model System 102, Comprising the Following Data from the Real System:

Current-time denoted as 0, and time-horizon T.

Current-state of the real-system which determines the state of the fluid-model system at time 0.

Predicted exogenous inputs into the real system over the time horizon.

Predicted levels of available resources over the time horizon.

Predicted rates of reward, per item in each class, and per action, over the time horizon.

(c) Solving said SCLP optimization problem 103, to obtain a fluid solution: The solution is obtained by a novel algorithm, which calculates the optimal solution of the problem in a finite number of iterations. The algorithm is based on a newly discovered concise finite representation of optimal solutions of SCLP problems. On the way to solving the SCLP problem with time horizon T, the algorithm constructs solutions for the SCLP problems of all the time horizons between 0 and T. The finite number of iterations proceed through a finite number of special time horizons $0=T^{(0)}<T^{(1)}<\ldots<T^{(R)}=T$ as follows:

Start from initial optimal solution for small time horizons, in the neighborhood of $T^{(0)}=0$.

For solution in the neighborhood of $T^{(r-1)}$, extend the concise representation of the solution to describe all the optimal solutions for a range of time horizons up to a maximal time horizon $T^{(r)}$.

construct a new solution for time horizon $T^{(r)}$ which can be extended to time horizons greater than $T^{(r)}$.

Iterate the previous steps until you reach $T^{(R)}=T$, and then terminate.

(d) Displaying the fluid solution by a graphical representation 104. This comprises a graph of the fluid levels in the buffers of the fluid-model system against time. It presents an approximation of the number of items in the various classes of the real-system as a function of time, and by doing so it gives a summary view of the dynamics of the system over the time horizon.

(e) Controlling the real system so as to imitate the optimal solution of the fluid-model system 105. This is done by choosing actions and allocating resources in the real system in such a way that the numbers of applications of actions in the real system are close to the corresponding cumulative rates of flow in the fluid-model system.

As a result the numbers of items in various classes as a function of time in the real system track the fluid levels in the buffers of the fluid-model system.

In an alternative embodiment of the method, illustrated schematically in FIG. 2, steps (b)-(e) are performed repeatedly at predetermined decision times separated by time increments of predetermined length S, 206, where S<T, to provide closed loop control of the system. The performance of steps (b)-(e) is modified as follows:

(b) After each time increment of S, reset current-time to 0, and reset time-horizon to T. Update the data of exogenous inputs, resource capacities, and reward rates to new predicted values, for the new time interval (0, T), 202.

(c) Use the optimal fluid solution of the SCLP problem of the previous increment as initial solution, and move smoothly from the data at the previous increment to the data of the current problem, in a finite sequence of iterations 203.

(d) Update graphic display 204.

(e) Use the fluid solution to control the system, 205, from the current time up to the next increment time S.

An embodiment of an apparatus for the operation and control of a real system over time is described schematically in FIG. 3. The apparatus 306 is linked to the system 307 and to the decision maker 308, and its function comprises mediating between the system and the decision maker. The apparatus comprises a plurality of process control devices 310 for controlling the system, a plurality of sensors 309 for sensing variable conditions of the system, and a means for modeling the system by a conceptual fluid-model 301, where the control devices, the sensing devices, and the fluid-model are integrated with the computing environment and software of the real system. It also comprised a graphic user interface 311 to interact with the decision maker. The apparatus 306 performs the same steps (b)-(e), interactively with the system and the decision maker, to provide closed loop control of the system:

(b) Formulate SCLP problem 302 for fluid-model system using data obtained by the sensing devices of the apparatus 309 from the system.

(c) Solve the SCLP 303.

(d) Update display 304, and allow interaction with decision maker through Graphic User Interface 311, by means of which the decision maker can modify the fluid solution.

(e) Calculate controls 305 and issue commands, through the process control devices 310, to operate the real system according to the fluid solution.

BRIEF DESCRIPTION OF THE DRAWINGS

FIG. 1 illustrates the five steps of our method for fluid control of systems.

FIG. 2 illustrates repeated use of our method in a closed loop control of the system.

FIG. 3 illustrates an apparatus linked to the system and to the decision maker, for the purpose of a closed loop control of the system.

FIG. 4 is a graphic description of the production process of a semiconductor wafer fabrication plant, which illustrates a re-entrant line manufacturing system suitable for modeling and control by our method.

FIG. 5 is a flowchart of our algorithm for the solution of general separated continuous linear programming problems.

FIG. 6 is a more detailed flowchart of our algorithm for the solution of separated continuous linear programming problems with linear data.

FIG. 7 is a graphic display of the iterations of the algorithm illustrated in FIG. 6, when it is applied to a specific numerical example of an economic input output system.

FIG. 8 is a graphic display of the solution of the example described in FIG. 7, for an infinite time horizon.

FIG. 9 illustrates the production process of a schematic re-entrant manufacturing system.

FIG. 10 is a graphic display of the optimal fluid solution of the system illustrated in FIG. 9, which shows the approximates levels of parts in the system at each production step.

FIG. 11 is an enhanced graphic display of FIG. 10, which shows the evolution of sampled individual parts through the production process.

FIG. 12 illustrates the use of a Graphic User Interface coupled to the display of FIG. 11, to expedite the production of certain parts, by modifying the fluid solution.

DETAILED DESCRIPTION OF THE INVENTION

The invention provides methods and apparatus for operation and control of a real system over a plurality of continuous times. The said real system comprises a plurality of items, a plurality of actions, and a plurality of resources. The said items are classified into a plurality of classes, so that each item belongs to one of the classes at each time. The classification of the items can be for example a classification according to type, location, age, stage of completion, stage of depletion, or any other distinction which is of significance in the operation and control of the system. Items evolve in time by changing their class, and these changes are occasioned by an application of one of the said plurality of actions, at one of the plurality of times. The plurality of actions can be for example transporting, transmitting, processing, machining, using, filling, depleting, or any other action which can occasion a change in the item. Each application of one of the said actions to one of the said items at one of the said times consumes some resources from said plurality of resources. The resources can be for example vehicles, roads, communication channels, machines, raw materials, energy, or any other resources needed to the application of an action. The operation and control of the system comprise timing of the application of actions to items, and scheduling the allocation of resources to the actions. The methods and apparatus for the operation and control of the system maximize rewards accrued by the system over time.

The preferred embodiment of the method and apparatus for control of systems comprises five stages, which are described in order here. Several alternative embodiments are described for some of the stages.

1 The Fluid Modeling Stage

In this stage we construct a conceptual fluid-model system which models the real system. The basic idea of a fluid model is to approximate the plurality of items by fluid, to approximate the evolution of items among classes by rates of change of the fluid, to approximate the application of actions to items at any time by rates of flow, and to approximate the resource consumption of the actions by rates of consumption. The elements of the fluid-model system and their relationship to the real system are:

A plurality of buffers numbered $k=1, \ldots, K$ each of which represents one of the said plurality of classes of the real system.

A plurality of real valued state functions $x(t)=(x_k(t):k=1, \ldots, K)$ such that $x_k(t)$ is the level of fluid in buffer k at time t in the fluid-model system, and $x_k(t)$ approximates the number of said items which are in class k at time t in the real system.

A plurality of flows numbered $j=1, \ldots, J$ each of which represents one of the said plurality of actions of the real system.

A plurality of real valued control functions $u(t)=(u_j(t): j=1, \ldots, J)$ such that $u_j(t)$ is the flow rate of flow j at time t in the fluid-model system, and $u_j(t)$ approximates the number of applications of action j at around the time t in the real system.

A linear relationship between controls and changes in state, expressed by a matrix G of dimensions K×J, such that −Gu(t) is the rate of change of x(t), occasioned by the controls u(t). This models the changes in the classes of items occasioned by the application of actions in the real system.

A plurality of resources i=1, . . . , I which represent the plurality of resources of the real system which are consumed by the actions.

A linear relationship between flows and the consumption of resources, expressed by a matrix H of dimensions I×J, such that Hu(t) is the rate of consumption of resources by controls u(t). This models the consumption of resources by the application of actions in the real system.

A plurality of real valued supplementary functions y(t)=(y$_l$(t):l=1, . . . , L), where L≧0, which are used to model additional features of the real system.

A linear relationship between the supplementary functions and the state, expressed by a matrix F of dimensions K×L, such that Fy(t) measures fluid that can be substituted for x(t), by supplementary values y(t).

1.1 Fluid Modeling of Manufacturing Systems

A first embodiment of the fluid modeling stage of our methods and apparatus includes the case when the real system is a manufacturing system. The manufacturing system comprises:

A plurality of machines i=1, . . . , I which are the resources.

A plurality of processing steps, numbered j=1, . . . , J which are the actions.

A plurality of partially manufactured parts which are the items, and each part in process can be classified according to its stage of completion, where stages of completion in the manufacturing process are numbered as k=1, . . . , K.

A particular processing step j is always applied to items in a particular stage of completion k=k(j), and it uses a particular machine i=i(j), for a duration with an average $m_j$. The result of the application of processing step j to a part in stage of completion k(j) is that the stage of completion of the part changes. A fraction $P_{j,l}$ of the parts in stage of completion k(j) will change their stage of completion to l by the application of action j. A fraction $1-\Sigma_{l \neq k(j)} P_{j,l}$ will depart from the system.

Hence, the elements of the matrices G, H are:

$$G_{l,j} = \begin{cases} 1 & l = k(j) \\ -P_{j,l} & l \neq k(j) \end{cases}$$

$$H_{i,j} = \begin{cases} m_j & i = i(j) \\ 0 & i \neq i(j) \end{cases}$$

Some special examples of manufacturing systems of this form are:

1.1.1 Fluid Modeling of Re-Entrant Line Manufacturing Systems

In a Re-Entrant Line Manufacturing System all the manufactured parts follow the same process which consists of a sequence of successive processing steps, where the production process revisits some of the machines several times. FIG. 4 shows a schematic picture of the production steps in a Semiconductor Wafer Fabrication Plant which produces computer chips (wafer fab), as an example of a real re-entrant manufacturing system. In FIG. 4 the vertical axis 401 lists the various machines and workstations of the wafer fab, while on the horizontal axis 402 are listed the successive production steps of the fabrication process. The path of the parts through the machines marks each step 403 with a blob. In a modern wafer fab as illustrated in FIG. 4 there will be an average of some 60,000 wafers in the fab at any time. For such a large number of wafers a fluid approximation is reasonable.

We number the consecutive processing steps k=1, . . . , K. The action of processing of step k is numbered as action k, and it requires one of the a machines i(k), for a duration which is on the average $m_k$. The process moves through the machines in the order i(1)→i(2)→ . . . →i(K)→Out. The matrix G for a re-entrant line is of dimension K×K and has the form:

$$G = \begin{bmatrix} 1 & 0 & \cdots & 0 \\ -1 & 1 & \cdots & 0 \\ 0 & \ddots & \ddots & 0 \\ 0 & \cdots & -1 & 1 \end{bmatrix}$$

The matrix H has $m_k$ in the i(k) position of column k.

1.1.2 Fluid Modeling of Job Shop Manufacturing Systems

Here there is a plurality of manufacturing processes, numbered r=1, . . . , R, and parts manufactured by process r require a total of $K_r$ processing steps, numbered in the order of processing as (r, 1), . . . , (r, $K_r$). Processing step (r, k) requires machine i(r, k) for a duration which is on the average $m_{r,k}$. The corresponding matrix G is now of dimension $$\sum_{r=1}^{R} K_r \times \sum_{r=1}^{R} K_r,$$

and is of block diagonal form, where each block is of the form of G for the re-entrant line.

1.2 Fluid Modeling of Traffic Systems

A second embodiment of the fluid modeling stage of our methods and apparatus includes the case when the real system is a city wide traffic system, with centralized control of traffic signals, and with some control over the routing of individual cars by means of signalling and communications with car operators. The traffic system comprises:

A plurality of road sections and a plurality of intersections connecting the road sections A plurality of vehicles, classified by their locations on road sections, and by their destinations The fluid buffer levels $X_{kl}(t)$ approximate the number of vehicles on road section k with destination l at time t. Controls $u_{kR}(t), u_{kD}(t), u_{kL}(t)$ indicate the rate at which vehicles on road section k are directed through intersection to the right, directly ahead, and to the left, respectively. Capacity constraints limit the sum $u_{kR}(t)+u_{kD}(t)+u_{kL}(t)$, and express the allocation of fractions of the time to different directions in the traffic signals.

1.3 Fluid Modeling of Communications Systems

A third embodiment of the fluid modeling stage of our methods and apparatus includes the case when the real system is a communication system, as embodied in a telephone system or in a internet system. The communication system comprises:

A communication network comprising nodes and links.

Messages, data packets, and files in transit in the system, classified by their route, where a route comprises origin node and destination node, and links along the route.

Fluid buffer levels $x_k(t)$ express total level of messages on route k. Flow rates $u_k$ express transmission rate on route k. Resource consumption of flow on route k includes all the links on this route.

1.4 Fluid Modeling of Multi-Project Scheduling

A fourth embodiment of the fluid modeling stage of our methods and apparatus includes the case when the real system is a multi-project. The said multiproject comprises a plurality of projects of similar nature, such as for example constructing switching stations by an electricity company, overhauling a ship in a shipyard, developing a village in an agricultural extension project, or other examples where a plurality of projects have to be performed, and each of these projects requires essentially the same plurality of activities.

The activities which need to be carried out for each of the plurality of projects are numbered $k=1, \ldots, K$. The activities are subject to a set of precedence constraints given by a subset of pairs, where $k \rightarrow l$ denotes that activity k needs to be completed before activity l of that project can be started. Activities require the use of resources, where $H_{ik}$ is the amount of resource i used by activity k.

In this multi-project scheduling system the items comprise all the activities of the projects which are ready to be performed. These items are classified by k. The actions are the performances of activities, also numbered as $k=1, \ldots, K$. In the fluid-model system $x_k(t)$ approximates the number of projects which are ready for performance of activity k, $A_k(t)$ is the cumulative fluid which has entered buffer k, and $D_k(t)$ the cumulative fluid that has departed buffer k. $u_k(t)$ is the rate of performing activity k. The relationships between the states and controls are:

$$D_k(t) = \int_0^t u_k(s)ds,$$
$$A_k(t) \leq D_j(t), \quad j \rightarrow k,$$
$$x_k(t) = A_k(t) - D_k(t).$$

The relationships between the controls and resources are given by the matrix H, where coefficient $H_{ik}$ is the average amount of resource i required by a single activity k.

1.5 Fluid Modeling of Supply Chain Management

A fifth embodiment of the fluid modeling stage of our methods and apparatus includes the case when the real system is a supply chain management system. Exogenous input to the system are orders placed with the system for particular dates, and each order generates a backlog of timed requests for items along the supply chain. Buffers of the fluid model approximate the level of demand of items backlogged along the supply chain, and the controls are the processing rates along the supply chain, subject to lead times and to limited capacities.

1.6 Fluid Modeling of Economic Systems

A sixth embodiment of the fluid modeling stage of our methods and apparatus includes the case when the real system is an input output economic system. Here $x_k(t)$ is the level of assets of type k available to the system at time t, $u_j(t)$ is the level of activity of type j, and the jth column of the matrix G includes a positive entry in position k(j) and negative or zero entries in all other positions $l \neq k(j)$, such that $G_{l,j}: l \neq k(j)$ are the input amounts of assets of type l required to produce $G_{j,k}(j)$ output units of asset k(j), per one unit of activity j. In addition, $H_{i,j}: i=1, \ldots, I$ is the amount of resource i consumed per unit of activity j.

2 The Fluid Problem Formulation Stage

Having modeled the real system by a fluid-model system, a fluid optimization problem is formulated. The fluid optimization problem is a Separated Continuous Linear Programming Problem, SCLP for short, substantially of the form (' denotes transpose of a vector or a matrix):

$$\max z = \int_0^T (c(T-t)'u(t) + d(T-t)'y(t))dt \qquad (1)$$
$$\text{subject to} \int_0^t Gu(s)ds + Fy(t) + x(t) = a(t),$$
$$Hu(t) = b(t), u(t), x(t) \geq 0, \quad 0 < t < T$$

where one seeks to determine the control, state, and supplementary functions, u, x, y so as to maximize the value of the objective function z. In this formulation G, H, F are features of the model determined in the fluid modeling stage. The remaining quantities, T, a, b, c, d are data which relates to the current-state of the real system. This data comprising:

The current-time, denoted by 0.

The planning-horizon, which is denoted by T.

The said continuous plurality of times for which one wishes to control the system being all the values of t in the interval $t: 0 < t < T$.

A plurality of projected reward rates, denoted $c(T-t)=(c_j(T-t): j=1, \ldots, J, 0<t<T)$, for the controls u(t) and a plurality of projected reward rates, denoted $d(T-t)=(d_l(T-t): l=1, \ldots, L, 0<t<T)$, for the supplementary variables y(t).

Current-time values $a(0)=(a_k(0): k=1, \ldots, K)$ which determine the initial fluid levels x(0), and current-time values of the resource limits, given by $b(0)=(b_i(0): i=1, \ldots, I)$.

Exogenous input rates into the fluid-model system, denoted $a(t)=(a_k(t): k=1, \ldots, K, 0<t<T)$, which are approximate projected exogenous input rates of items into the real system.

Resource limits $b(t)=(b_i(t): i=1, \ldots, I, 0<t<T)$ which constrain u(t), and which approximate the projected resource limits of the real system.

3 The Fluid Solution Stage

The Fluid Solution Stage comprises the solution of the Separated Continuous Linear Programming Problem (SCLP for short) formulated in the formulation stage, by a new algorithm. The algorithm produces a Fluid Solution. The fluid solution comprises the optimal control functions and the optimal state functions of the fluid-model system. In the following paragraphs we present a detailed description of this algorithm.

An embodiment of a general algorithm for the solution of SCLP is described first. Next an embodiment for a special case in which the data a, c are linear functions of time, and b, d are constant in time, is described in greater detail. This embodiment has also been programmed and can be run using the program on the attached CD. Next a small example is solved to illustrate the operation of the algorithm. Finally ramifications of the general algorithm are described.

3.1 Embodiment of a General SCLP Algorithm

We now present a detailed description of a preferred embodiment of a novel general algorithm for the solution of General Separated Continuous Linear Programming problems. For ease of notation and reference we refer to the model formulated in the modeling and problem formulation stage as SCLP(G, H, F), and refer to the data for this problem as DATA(T, a, b, c, d). The following description of the algorithm is in several parts. First we state some preliminaries, notation, definitions, and theoretical results. Second we describe a finite and concise representation of the solution of SCLP(G, H, F) with DATA(T, a, b, c, d). Third we extend this finite concise representation to represent the solutions for a range of problems, DATA$((1-\theta)(T_1, a_1, b_1, c_1, d_1)+\theta(T_2, a_2, b_2, c_2, d_2))$ for $\underline{\theta}<\theta<\overline{\theta}$. Fourth we outline the algorithm. Finally we discuss some additional implementation issues.

3.1.1 Preliminaries, Notation, Definitions and Theoretical Results

A symmetric dual to SCLP (1) is SCLP*:

$$\min \int_0^T (a(T-t)'p(t) + b(T-t)'r(t))dt \quad (2)$$

$$\text{subject to } \int_0^t G'p(s)ds + H'r(t) - q(t) = c(t),$$

$$F'p(t) = d(t), \ p(t), q(t) \geq 0, \ 0 < t < T$$

which has dual control functions p, dual state functions q and dual supplementary functions r.

Functions u, x, y which satisfy the primal constraints are called a primal solution, and functions p, q, r which satisfy the dual constraints are called a dual solution. The solutions are complementary slack if:
when $x_k(t)>0$ then $p_k(T-t)=0$,
when $u_j(t)>0$ then $q_j(T-t)=0$.

Complementary slack solutions are optimal. The proposed method for solving SCLP produces such solutions.

To describe a complementary slack solution u, x, y, p, q, r it is enough to give its boundary values x(0), y(0), q(0), r(0) at time 0, and its rates u(t), $\dot{x}(t)$, $\dot{y}(t)$, p(t), $\dot{q}(t)$, $\dot{r}(t)$, 0<t<T, where $\dot{x}(t)$, $\dot{y}(t)$, $\dot{q}(t)$, $\dot{r}(t)$ are the time derivatives of x(t), y(t), q(t), r(t) respectively.

The boundary values x(0), y(0) and q(0), r(0) are given by the solutions of the linear programs:

$$\max d(T)'y(0)$$

$$\text{subject to } Fy(0)+x(0)=a(0),$$

$$x(0)\geq 0,$$

$$\min b(T)'r(0)$$

$$\text{subject to } H'r(0)-q(0)=c(0),$$

$$q(0)\geq 0. \quad (3)$$

The rates u(t), $\dot{x}(t)$, $\dot{y}(t)$, p(t), $\dot{q}(t)$, $\dot{r}(t)$ at each t are solutions of the following dual sets of linear program constraints:

$$Gu(t)+F\dot{y}(t)+\dot{x}(t)=\dot{a}(t),$$

$$Hu(t)=b(t),$$

$$u(t)\geq 0,$$

$$G'p(t)+H'\dot{r}(t)-\dot{q}(t)=\dot{c}(t),$$

$$F'p(t)=d(t),$$

$$p(t)\geq 0. \quad (4)$$

A pair of solutions with boundary values defined by (3) and time derivatives satisfying (4) are optimal if the following complementary slackness condition holds for almost all t:

if $x_k(t)>0$ or if $\dot{x}_k(t)\neq 0$ then $p_k(T-t)=0$, k=1, ..., K,
if $q_j(T-t)>0$ or if $\dot{q}_j(T-t)\neq 0$ then $u_j(t)=0$, j=1, ..., J, and if also for all t:

$$x_k(t)\geq 0 \ k=1, \ldots, K,$$

$$q_j(t)\geq 0 \ j=1, \ldots, J. \quad (5)$$

If the problem is non-degenerate a stronger complementary slackness condition holds at optimality:

$$x_k(t)\geq 0 \text{ if and only if } \dot{x}_k(t)\neq 0 \text{ if and only if } p_k(T-t)=0,$$
$$k=1, \ldots, K,$$

$$q_j(T-t)>0 \text{ if and only if } \dot{q}_j(T-t)\neq 0 \text{ if and only if }$$
$$u_j(t)=0, j=1, \ldots, J, \quad (6)$$

holds for all but a finite number of t.

Any problem can be made non-degenerate by a small perturbation of the data, and an algorithm which works for non-degenerate problems can be applied to degenerate problems by using well known perturbation methods or by using other well-known techniques of linear programming to handle degeneracy. Therefore we only describe here the algorithm for non-degenerate problems.

The set of values of complementary slack u(t), $\dot{x}(t)$, $\dot{y}(t)$, p(t), $\dot{q}(t)$, $\dot{r}(t)$ is fully determined by the linear constraints (4) once the sets of non-zero u, $\dot{x}$ are specified. The basis B(t) at time t is the set of K+I−L variables $u_j$, $\dot{x}_k$ which are $\neq 0$ at time t. The solution of the SCLP(G, H, F) with DATA(T, a, b, c, d) is therefore fully determined by specifying the bases B(t): 0<t<T. Two bases are called adjacent if they differ by a single element. For example, bases $B_1$, $B_2$ are adjacent if there are variables v, w:v≠w such that $B_2=B_1-v+w$. In that case one says that v leaves the basis and w enters the basis in the pivot $B_1 \to B_2$.

3.1.2 A Concise Finite Description of the Solution

For a wide range of problems, including all the practical problems which we wish to solve, the solution to SCLP(G, H, F) with DATA(T, a, b, c, d) is described as follows:

There exists a finite sequence of adjacent bases, $B_1$, $B_2$, ..., $B_N$, and breakpoint times $0=t_0<t_1<\ldots<t_N=T$ such that $B(t)=B_n:t_{n-1}<t<t_n$, and the breakpoints $t_1, \ldots, t_{N-1}$ are determined by the equations:

$x_k(t_n)=0$ when $\dot{x}_k$ leaves the basis in $B_n \to B_{n+1}$, $q_j(T-t_n)=0$ when $u_j$ leaves the basis in $B_n \to B_{n+1}$. (7)

3.1.3 Extension of a Solution to a Range of Data Values

If $B_1, \ldots, B_N$ describe the solution to SCLP(G, H, F) with DATA$(T_0, a_0, b_0, c_0, d_0)$, then $B_1, \ldots, B_N$ also describes the solution for the range of data values DATA$((T_0, a_0, b_0, c_0, d_0)+\Delta(T, a, b, c, d))$ for fixed (T, a, b, c, d) and for a range of values of the parameter $\Delta$, in a positive interval containing 0.

In fact, in the solution for various values of $\Delta$, the boundary values change with the change in data of (3), the values of u, $\dot{x}$, $\dot{y}$, p, $\dot{q}$, $\dot{r}$ change with the change in the data of (4), the values of x, q change with the change in their boundary values and derivatives, and the values $t_1, \ldots, t_{N-1}$ change with the change in data of (7). All these changes are continuous in the parameter $\Delta$, so that the solution remains optimal for a range of values.

The solution will cease to be optimal for $\Delta>\overline{\Delta}\geq 0$ or for $\Delta<\underline{\Delta}\leq 0$, if at $\overline{\Delta}$ or $\underline{\Delta}$ one of the following occurs:

One or more of the time breakpoints collide, that is the solution of (7), for some n'<n", has values $t_{n'}=\ldots=t_{n''}=t$.

One of $x_k(t)$ or $q_j(T-t)$ hits the value 0.

One of $u_j(t)$ or $p_k(T-t)$ hits the value 0.

We call $\underline{\Delta}$, $\overline{\Delta}$ range of validity boundaries for the solution $B_1, \ldots, B_N$. As the parameter $\Delta$ reaches one of the range of validity boundaries we say that a collision occurs at time t.

3.1.4 Operation of the Algorithm

FIG. 5 presents a flowchart of the general algorithm for the solution of SCLP problems. To solve SCLP(G, H, F) with DATA(T, a, b, c, d), we start from a known optimal solution to SCLP(G, H, F) with DATA($T_0$, $a_0$, $b_0$, $c_0$, $d_0$), 501, and construct the optimal solutions to SCLP(G, H, F) with DATA((1−θ)($T_0$, $a_0$, $b_0$, $c_0$, $d_0$)+θ(T, a, b, c, d)), 502, for all 0<θ≦1. At θ=1 this gives the solution of SCLP(G, H, F) with DATA(T, a, b, c, d), 503.

The algorithm performs a finite number of iterations, 504, each of which comprises:

Given a solution valid for values of the parameter θ>$\underline{\theta}$, 505, find the upper range of validity boundary $\overline{\theta}$, 506, and find the collision time t and the type of collision.

Find a new solution at $\overline{\theta}$, which is valid for values of the parameter θ>$\overline{\theta}$, 507, according to the type of collision, by modifying the solution at the collision time t as follows:

1. If some intervals shrank to zero between $t_{n'}$ and $t_{n''}$, remove the bases $B_{n'+1}, \ldots, B_{n''}$ from the sequence of bases.
2. Insert 0, one, or more new bases into the sequence of bases, at the time t, so that the bases in the new sequence will be adjacent.

The second step requires the solution of an LP problem to find a first basis to insert. If that basis is not adjacent to the predecessor and successor bases in the sequence then further bases need to be inserted. These further bases are found by formulating a sub-problem, which involves the first basis to insert, the predecessor basis, and the successor basis. The sub-problem is in itself an SCLP, of a smaller dimension than the SCLP(G, H, F) which has called it. When the sub-problem is solved it provides a sequence of adjacent bases which are inserted between the predecessor basis and the successor basis in the solution of SCLP(G, H, F).

The algorithm will start with θ=0, and terminate, after a finite number of iterations, when θ=1 is reached.

3.1.5 Discussion

The algorithm described here can be implemented in this form for any DATA(T, a, b, c, d).

Some of the steps taken by the algorithm need to be tailored to the particular functions a, b, c, d which arise in the real system.

In particular, the solution of the equations of the form $x_k(t_n)=0$, $q_j(T-t_n)=0$, the calculation of local minima of the primal and dual state functions x, q, and the tracking of the changes in $t_n$ and in the values and locations of the local minima of $x_k(t)$ and of $q_j(T-t)$, as a function of θ are required.

In the next section we describe in detail how this can be achieved when the functions a, c are linear, and the functions b, d are constant. Further ramifications of the embodiment for this linear data case include the case where a, c are piecewise linear and b, d are piecewise constant. Other cases for which one can easily extend the results are when c(t) are exponential functions, which corresponds to discounted rewards. In this exponential case as well as for other specific functional forms of the functions a, b, c, d some well known mathematical and numerical techniques can be used to solve the equations of the form $x_k(t_n)=0$, and $q_j(T-t_n)=0$, and to calculate numerically the local minima of the functions $x_k(t_n)$, $q_j(T-t_n)$. This can be carried out as needed by a person of ordinary skill in the art of mathematics and numerical computation, and will enable such person to make use of the algorithm described here.

3.2 Embodiment of the Algorithm for the Case of Linear Data

The following embodiment of the algorithm is for the special case where the data is of the form:

$a(t)=\alpha+at, b(t)=b, c(t)=\gamma+ct, d(t)=d.$

The primal SCLP is:

$$\max = \int_0^T ((\gamma + (T-t)c)'u(t) + d'y(t))dt$$

$$\text{subject to } \int_0^t Gu(s)ds + Fy(t) + x(t) = \alpha + at,$$

$$Hu(t) = b, u(t), x(t) \geq 0, \quad 0 < t < T$$

In this linear data case one can rewrite the data of the problem as: DATA(T, α, a, b, γ, c, d), where α, a, b, γ, c, d are constant vectors (rather than functions of time).

3.2.1 Preliminaries, Notation, Definitions and Theoretical Results

The dual SCLP* is:

$$\min = \int_0^T ((\alpha + (T-t)a)'p(t) + b'r(t))dt$$

$$\text{subject to } \int_0^t G'p(s)ds + H'r(t) - q(t) = \gamma + ct,$$

$$F'p(t) = d, p(t), q(t) \geq 0, \quad 0 < t < T$$

The boundary values are obtained from:

max d'$y^0$ subject to $Fy^0+x^0=\alpha$, $x^0 \geq 0$, min b'$r^N$ subject to $H'r^N - q^N = \gamma$, $q^N \geq 0$. (8)

The linear constraints for the rates are:

$Gu+F\dot{y}+\dot{x}=a$, $Hu=b$, $u \geq 0$, $G'p+H'\dot{r}-\dot{q}=c$, $F'p=d$, $p \geq 0$. (9)

In a solution for DATA(T, α, a, b, γ, c, d) the rates u(t), $\dot{x}$(t), $\dot{y}$(t), p(T−t), $\dot{q}$(T−t), $\dot{r}$(T−t) are piecewise constant and the state functions x(t), y(t), q(T−t), r(T−t) are continuous piecewise linear, with the breakpoints $0=t_0<t_1<\ldots<t_N=T$. For the interval $(t_{n-1}, t_n)$ the basis $B_n$ uniquely determines the non-degenerate values of the rates which are constant in the interval. We denote these values by $u^n$, $\dot{x}^n$, $\dot{y}^n$, $p^n$, $\dot{q}^n$, $\dot{r}^n$. The corresponding values of x, y, q, r are linear in the interval, and can be interpolated between the values at the end points, which we denote by $x^n=x(t_n)$, $q^n=q(T-t_n)$.

For a sequence of adjacent bases $B_1, \ldots, B_N$, one can write linear equations for the interval lengths between the breakpoints, $\tau_n = t_n - t_{n-1}$, $n=1, \ldots, N$ as follows:

$$\tau_1 + \ldots + \tau_N = T$$

and for $n=1, \ldots, N-1$, if v leaves the basis in $B_n \to B_{n+1}$, $$\sum_{m=1}^{n} \dot{x}_k^m \tau_m = -x_k^0, \quad \text{when } v = \dot{x}_k,$$

$$\sum_{m=n+1}^{N} \dot{q}_j^m \tau_m = -q_j^N, \quad \text{when } v = u_j.$$

The conditions that $x(t), q(t) \geq 0$ hold if:
when $\dot{x}_k^n < 0$, and when $\dot{x}_k^{n+1} > 0$ or $n=N$, then $$\sum_{m=1}^{n} \dot{x}_k^m \tau_m \geq -x_k^0,$$

when $\dot{q}_j^n > 0$ or $n=0$, and when $\dot{q}_j^{n+1} < 0$, then $$\sum_{m=n+1}^{N} \dot{q}_j^m \tau_m \geq -q_j^N.$$

These equations and inequalities can be written as:

$$\begin{bmatrix} 1 \ldots 1 & 0 \\ A & 0 \\ B & -I \end{bmatrix} \begin{bmatrix} \tau \\ \sigma \end{bmatrix} = \begin{bmatrix} T \\ e \\ f \end{bmatrix}. \quad (10)$$

In this shorthand form of the equations, $1 \ldots 1$ are the coefficients of the first equality, A are the coefficients of the next N−1 equalities, and B are the coefficients of the inequalities. These coefficients in A, B are the values of the various rate variables determined by the bases $B_1, \ldots, B_N$. The coefficients are determined by G, F, H and by a, b, c, d. The right hand side e, f consist of values of $-x_k^0$ and $-q_j^N$, which are determined by G, F, H and by $\alpha$, $\gamma$, b, d. The time horizon appears only as first element in the right hand side. The unknowns are the interval lengths $\tau_1, \ldots, \tau_N$, and the vector a which is the vector of the values of the local minima of the primal and dual states x, q, which are called the slacks.

A sequence of adjacent bases $B_1, \ldots, B_N$ is optimal for DATA(T, $\alpha$, a, b, $\gamma$, c, d) if:
(i) The bases are consistent with the boundary values, in that the basis $B_1$ includes all the variables $\dot{x}_k$ for which $x_k^0 > 0$, and the basis $B_N$ excludes all the variables $u_j$ for which $q_j^N > 0$.
(ii) The bases are feasible in the sense that $u^n$, $p^n \geq 0$.
(iii) The solutions of the equations are $\tau$, $\sigma \geq 0$.

A change in T or in $\alpha$ or in $\gamma$ will result in a linear change in the solutions $\tau$, $\sigma$. Hence if the solution for $T_i, \alpha_i, \gamma_i$ is given by $\tau = g_i, \sigma = h_i$, where $i=1, 2$, then the solution for $T_1 + \Delta T_2, \alpha_1 + \Delta\alpha_2, \gamma_1 + \Delta\gamma_2$ is $\tau = g_1 + \Delta g_2, \sigma = h_1 + \Delta h_2$, which is linear in $\Delta$ and may provide optimal solutions for a range of parameter values $\underline{\Delta} < \Delta < \overline{\Delta}$.

3.2.2 Iterations of the Algorithm for Linear Data

FIG. 6 presents a flowchart of the preferred embodiment of the algorithm for the solution of SCLP problems with linear data. For fixed values of $\alpha$, a, b, $\gamma$, c, d the algorithm constructs a solution of SCLP(G,F,H) for all $T: 0 < T < \infty$ in a finite number of steps. To obtain the solution for DATA(T, $\alpha$, a, b, $\gamma$, c, d) with some fixed T the algorithm can be terminated when T is reached.

The solutions for all $T: 0 < T < \infty$ are summarized by a finite sequence of special time horizons $0 = T^{(0)} < T^{(1)} < \ldots < T^{(R)} < T^{(R+1)} = \infty$, such that in each of the time horizon ranges $T^{(r-1)} < T < T^{(r)}$, the solution is given by a sequence of adjacent bases, $B_1^r, \ldots, B_{N_r}^r$.

The algorithm solves the problem in R+1 iterations on r, 601, as follows:

Initial Step The boundary values $x^0$, $q^N$ are found from the Linear Programs for the boundary values (8), 602. The solution for time horizons $0 = T^0 < T < T^1$ is given by the single basis $B_1^1$ determined from the boundary values, 603. It is the optimal basis of the linear program with primal and dual constraints for the rates (9), with the restrictions:
if $x_k^0 > 0$ then $\dot{x}_k$ is "U",
if $q_j^N > 0$ then $u_j$ is "Z",
where "U" denotes that the variable is unrestricted in sign, and hence it is in the optimal basis, while "Z" denotes that the variable is restricted to the value 0 and hence it is not in the basis.

Iteration r This starts from an optimal solution described by the adjacent bases $B_1^r, \ldots, B_{N_r}^r$, which provide a valid solution for a range of time horizons $T > T^{(r-1)}$, 604.

Find Range Formulate the linear equations (10), 605, for time horizons $T^{(r-1)} + \Delta$, and solve them, to obtain the values of the interval lengths and of the slacks, as a function of the parameter $\Delta$, 606, in the form: $(\tau, \sigma) = \hat{g} + \Delta \hat{h}$. Then, find the validity range boundary $\overline{\Delta} > 0$, as the maximal $\Delta$ for which $\tau, \sigma \geq 0$, 607. Set the end of the range of validity to $T^{(r)} = T^{(r-1)} + \overline{\Delta}$, 609.

Diagnose Collision When $\overline{\Delta}$ is reached, there are the following possibilities:

Case i, 610: At collision time $t_n$, intervals between bases B', B" shrink to 0, and B' and B" are adjacent.

Case ii, 611: At collision time $t_n$ intervals between bases B', B" shrink to 0, and B' and B" differ by two variables, v', v" where in the solution $B_1^r, \ldots, B_{N_r}^r$, between B', B", v' leaves the basis before v".

Case iii, 612: At collision time $t_n$ a slack value of one of the $\sigma$ hits 0, where $0 < n < N$ and in the pivot $B_n \to B_{n+1}$ v leaves the basis. If the slack that hits 0 is $x_k(t_n) = 0$, let v'=v and v"=$\dot{x}_k$. If the slack that hits 0 is $q_j(T-t_n) = 0$, let v'=$u_j$ and v"=v.

Case iii$_a$, 612: At collision time $t_0$ a slack value of one of the $\sigma$ hits 0, and the slack that hits 0 is $q_j(T) = 0$. In that case set v'=$u_j$.

Case iii$_b$, 612: At collision time $t_N$ a slack value of one of the $\sigma$ hits 0, the slack that hits 0 is $x_k(T) = 0$. In that case set V"=$\dot{x}_k$ Other Cases: In any other case, perturbation of the problem will result in one of the Cases i, ii, iii, iii$_a$, iii$_b$.

Construct a new sequence of bases, modified at the collision time, by deleting 0, 1, or more bases, and inserting 0, 1, or more bases, according to the collision case:

In collision cases i, ii delete all the bases between B' and B", 613.

In collision cases ii, iii, iii$_a$, iii$_b$, solve LP with new sign restrictions to find a new optimal basis D, 614, so that D has the same sign restriction as B' except that v" needs to leave the basis in the pivot B'→D, or equivalently, D has the same sign restrictions as B" except that v' needs to leave the basis in the pivot D→B".

If D is adjacent to B' and to B", insert the single basis D between B' and B", 615.

If D is not adjacent to B' and to B", formulate and solve a subproblem, to obtain a sequence of adjacent bases $D_1, \ldots, D_M$, where $D_1$ is adjacent to B', and $D_M$ is adjacent to B", 616. Then insert the bases $D_1, \ldots, D_M$ between B' and B", 617.

The new sequence of bases $B_1^{r+1}, \ldots, B_{N_{r+1}}^{r+1}$ is optimal for $T^{(r)}$, and it is also optimal for values $T > T^{(r)}$, 618.

Termination When $\bar{\Delta} = \infty$, set $R = r-1$, and $T^{(R+1)} = \infty$, 608, and terminate.

Formulation and solution of subproblems: If B' and D are not adjacent, formulate and solve a subproblem as follows:

Set T=1.

Eliminate $u_j$, $\dot{q}_j$, $q_j$ from the subproblem if $q_j(t_n) > 0$.

Eliminate $p_k$, $\dot{x}_k$, $x_k$ from the subproblem if $x_k(t_n) > 0$.

Use boundary values of 0 for all remaining x and q except v".

If $v'' = \dot{x}_k$ use boundary value of 0 for $x_k^0$. Start with initial solution given by the single basis D. Iterate the subproblem by increasing $x_k^0$.

If $v'' = u_j$ use the value of the rate in the basic solution D, denoted $\dot{q}_j^D$, and set the initial boundary value $q_j^N$ to $-\dot{q}_j^D$. Start with initial solution given by the single basis D. Iterate the subproblem by decreasing $q_j^N$.

Terminate the subproblem iterations when $D_1$ is adjacent to B'.

Other cases are analogous.

3.3 Demonstration of the Algorithm by a Small Numerical Example

The following numerical example illustrates the embodiment of the algorithm for linear data. This example consists of an Economic Input Output System, in which there are 8 assets, numbered $k=1, \ldots, 8$, and there are 12 activities, numbered $j=1, \ldots, 12$, and if activity j is used at time t at the rate $u_j(t)$, it will produce assets of type $k(j)$ in a quantity of $G_{k(j),j}$ per unit of $u_j(t)$, and will consume an amount of $-G_{l,j}$ from asset l, where $l=1, \ldots, 8$, $l \neq k(j)$, per unit of $u_j(t)$. Also, the use of activity j at time t will consume a quantity $H_{i,j}$ of resource i per unit of $u_j(t)$, for each of the 5 resources numbered $i=1, \ldots, 5$. The matrices of coefficients G, H define the fluid-model.

The rest of the data to formulate the fluid-problem includes: The initial level of the assets at time 0 are $\alpha_k$, $k=1 \ldots, 8$, the exogenous constant input rates of the assets are $a_k$, $k=1 \ldots, 8$, for all $t > 0$, the limits on the resources are the constant values $b_i$, $i=1, \ldots, 5$, and the reward rates per unit of activity j at time t, over the remaining time horizon T-t, are $c_j$, $j=1, \ldots, 12$.

The values of the coefficients of G, H, and the remaining data, $\alpha$, a, b, c, are given in Table 1. In this example F, $\gamma$, d=0. Additional primal control functions $u_j(t)$, $j=13, \ldots, 17$ denote the slacks in the resource constraints with corresponding additional dual state functions $q_j(t)$, $j=13, \ldots, 17$.

We now solve the problem for all time horizons $0 < T < \infty$. The boundary values f the solution are $x(0) = \alpha$, $q(0) = 0$. The initial optimal basis is $$B_1 = \{\text{all } \dot{x}, u_2, u_6, u_{14}, u_{15}, u_{17}\}.$$

In this initial basis one is using activities 2, 6, which use up all the capacity of resources 1, 4, while resources 2, 3, 5 have slack capacities given by $u_{14}, u_{15}, u_{17}$. To describe each iteration we state the collision which happens, and list the pivots from $B_n \to B_{n+1}$, $n=1, \ldots, N-1$.

FIG. 7 is a useful illustration of the evolution of the solution by the algorithm, for all the time horizons. In FIG. 7 the vertical axis is the time horizon (pointing downward), and the horizontal axis is the time t, which is bounded by $0 < t < T$. For each T, the time $0 < t < T$ is divided into N intervals, by the breakpoints $t_1, \ldots, t_N$. The full picture of FIG. 7 shows how the breakpoints change as a function of the time horizon. FIG. 7 also shows the validity ranges for each sequence of bases, and the collisions. Each of the lines which gives one of the breakpoints is marked by the corresponding primal or dual state variable which hits zero at the breakpoint. It is marked $x_k$ if $\dot{x}_k$ leaves the basis. This means that $x_k > 0$ on the left and $x_k = 0$ on the right. It is marked $q_j$ if the event at that point is that $u_j$ leave the basis. This means that $q_j > 0$ on the right, and $q_j = 0$ on the left.

Iteration 1 The single basis sequence $B_1$ is optimal for $0 < T < T^{(1)} = 0.472$, 701.

At $T^{(1)}$ a collision Case $iii_b$, $x_4 = 0$, occurs at time $t_1$. To obtain the next solution a single basis is inserted at $t_1$.

TABLE 1

Data for an Example of an Economic Input Output System

| c | 2. | 7. | 3. | 5. | 2. | 7. | 2. | 4. | 6. | 3. | 4. | 3. | α | |
|---|---|---|---|---|---|---|---|---|---|---|---|---|---|---|
| | | | | | | | | | | | | | | a |
| G | 0 | 0 | 0 | 0 | 0 | 0 | 0 | 0 | 0 | −2.6 | 0 | 0 | 36. | 1.2 |
| | 0 | 0 | 0 | −2.8 | 0 | 0 | 0 | 3. | −3.7 | −1.1 | −3.4 | 8.1 | 28. | 1.1 |
| | 2.9 | 3.1 | 7.4 | 8.9 | 0 | 0 | −3.5 | −2.9 | −3.7 | 0 | 0 | 0 | 31. | 1.2 |
| | −1.9 | 0 | 0 | 0 | 0 | 5.4 | 8.4 | 0 | 4.5 | 3.6 | 3.3 | −1.6 | 29. | 1.3 |
| | 0 | 0 | 0 | −1.5 | 0 | −3.4 | −2.2 | −1.2 | 0 | 0 | −3.5 | −3.2 | 26. | 1. |
| | −2.2 | 0 | 0 | 0 | −2.5 | 0 | 0 | −2.8 | −2.7 | 0 | 0 | 0 | 30. | 1.9 |
| | 0 | −1.9 | 0 | 0 | 0 | 0 | −3.7 | 0 | 0 | 0 | 0 | 0 | 26. | 1.4 |
| | 0 | 0 | 0 | −3.5 | 5.2 | −2.7 | 0 | 0 | −3.7 | −1.9 | 0 | 0 | 34. | 1.3 |
| | | | | | | | | | | | | | | b |
| H | 6.5 | 8. | 6. | 6.4 | 5.4 | 7.8 | 6.5 | 5.6 | 7.4 | 3.6 | 7.3 | 6.9 | ≤ | 106 |
| | 0 | 3.9 | 5.8 | 4.8 | 0 | 0 | 0 | 7.4 | 0 | 7.3 | 0 | 3.8 | | 66. |
| | 0 | 0 | 3.1 | 0 | 5.9 | 0 | 5.8 | 6.4 | 0 | 7.1 | 5.5 | 0 | | 115. |
| | 4.9 | 0 | 7.5 | 5.2 | 4.6 | 7.4 | 0 | 6.9 | 0 | 0 | 0 | 6.4 | | 86. |
| | 7. | 4.3 | 4.9 | 0 | 0 | 0 | 3.6 | 0 | 7.5 | 0 | 6.2 | 0 | | 112. |

Iteration 2: The sequence of pivots:

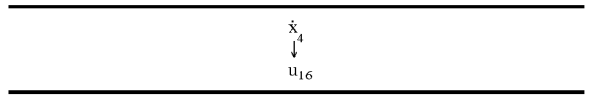

is optimal for $0.472 < T < T^{(2)} = 1.206$, 702.

At $T^{(2)}$ a collision case iii$_b$, $x_3 = 0$, occurs at time $t_2$. To obtain the next solution a subproblem is solved, and 4 new bases are inserted at $t_2$.

Iteration 3: The sequence of pivots:

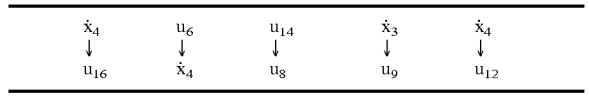

is optimal for $1.206 < T < T^3 = 1.373$, 703.

At $T^{(3)}$ a collision Case i, $\tau_2 = 0$ occurs, To obtain the next solution a single basis is deleted between $t_1$, $t_2$.

Iteration 4: the sequence of pivots:

is optimal for $1.373 < T < T^{(4)} = 2.180$, 704.

At $T^{(4)}$ a collision case ii, $\tau_3 = 0$ occurs. To obtain the next solution a single basis is exchanged between $t_2$, $t_3$.

Iteration 5: The sequence of pivots:

is optimal for $2.180 < T < T^{(5)} = 3.681$, 705.

At $T^{(5)}$ a collision Case i, $\tau_1 = 0$ occurs. To obtain the next solution a single basis is deleted between $t_0$, $t_1$.

Iteration 6: the first basis in the sequence is now $B_1 = \{\text{all } \dot{x}, u_2, u_{14}, u_{15}, u_{16}, u_{17}\}$.

The sequence of pivots:

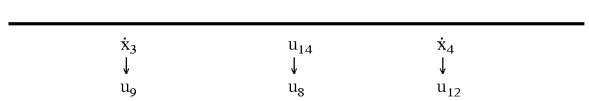

is optimal for $3.681 < T < T^{(6)} = 4.353$, 706.

At $T^{(6)}$ a collision Case iii$_b$, $x_2 = 0$, occurs at $t_4$. To obtain the next solution a subproblem is solved, and 2 new bases are inserted at $t_4$.

Iteration 7: the sequence of pivots:

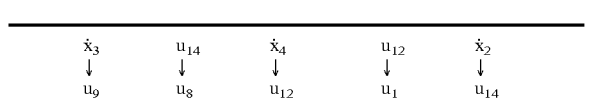

is optimal for $4.353 < T < T^{(7)} = 4.589$, 707.

At $T^{(7)}$ a collision case ii, $\tau_2 = 0$ occurs. To obtain the next solution a single basis is exchanged between $t_1$, $t_2$.

Iteration 8: the sequence of pivots:

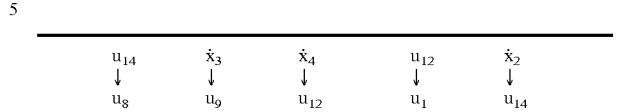

is optimal for $4.589 < T < T^{(8)} = 5.015$, 708.

At $T^{(8)}$ a collision case i, $\tau_4 = 0$ occurs. To obtain the next solution a single basis is deleted between $t_3$, $t_4$.

Iteration 9: The sequence of pivots:

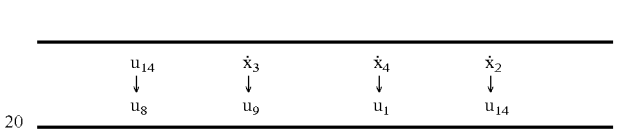

is optimal for $5.015 < T < \infty$, 709.

Algorithm terminates, with R=8.

FIG. 8 presents the solution of this input output economic example for the final range of time horizons, that is the solution which is optimal for all time horizons beyond $T^{(R)} = 5.015$. In this figure, the fluids in the buffers $x_1, \ldots, x_8$ are plotted one above the other, as a function of time. Note the 4 time breakpoints. At $t_1$ the variable $u_{14}$ leaves the basis, which means resource i=2 becomes fully utilized after $t_1$, 801. At $t_2$, $t_3$, $t_4$, the fluid buffers $x_3$, $x_4$, $x_2$, respectively, empty: 802, 803, 804. These correspond to the breakpoints shown in FIG. 7, in the last iteration, 709.

3.4 Ramification of the Separated Continuous Programming Algorithm

A preferred embodiment which is a ramification of the general SCLP algorithm described above allows the model matrices G, H, F to be piecewise constant, that is for some predetermined time points $0 = s_0 < s_1 < s_2 < \ldots < s_M = T$ dividing the time horizon, the coefficients of the model change: The matrices of coefficients of the model in the interval $s_{m-1}$, $s_m$ are given by $G_m$, $H_m$, $F_m$, $m = 1, \ldots, M$. The algorithm is essentially unchanged, with the following modifications to the concise form of the optimal solution:

Each of the time points $0 = s_0 < s_1 < s_2 < \ldots < s_M = T$ is a breakpoint of the solution, in addition to the points $t_n$ determined by times at which primal or dual variables hit the value 0

Within each interval $s_{m-1}$, $s_m$ the solution is exactly as described for the general algorithm, where one uses boundary values: $x(s_{m-1})$, $y(s_{m-1})$ and $q(T-s_m)$, $r(T-S_m)$.

The boundary values are determined by the linear programs:

$$\max d(T-s_{m-1})'y(s_{m-1})$$

subject to $F_m y(s_{m-1}) + x(s_{m-1}) = a^m$, $$x(s_{m-1}) \geq 0,$$

$$\min b(s_m)'r(T-s_m)$$

subject to $H'_m r(T-s_m) - q(T-s_m) = c^m$, $$q(T-s_m) \geq 0. \tag{11}$$

where $$a^m = a(s_{m-1}) - \sum_{l=1}^{m-1} \int_{s_{l-1}}^{s_l} G_l u(s) ds \qquad (12)$$

$$c^m = c(T - s_m) - \sum_{l=m+1}^{M} \int_{T-s_l}^{T-s_{l-1}} G'_l p(s) ds$$

4 Graphic Display of the Fluid Solution

Graphic Display of the Fluid Solution is a powerful tool for the design, planning, forecasting, performance evaluation, and control of the real system.

The Fluid Solution, produced by the Separated Continuous Linear Programming Problem, comprises the optimal fluid states $x_k(t)$:k=1, ..., K, 0<t<T. These optimal fluid states approximate the state of the real system, in that $x_k(t)$ approximates the number of items classified as class k at time t, under optimal conditions. The Graphic Display of the Fluid Solution presents $x_k(t)$:k=1, ..., K, 0<t<T visually.

The advantages of the Graphic Display of the Fluid Solution include:

While it is impossible to provide a visual display of all the items in the real system over the time horizon 0<t<T, the display of the fluid states $x_k(t)$:k=1, ..., K, 0<t<T captures the relevant information of the real system.

Since the fluid state is obtained by solving the SCLP, $x_k(t)$: k=1, ..., K, 0<t<T presents a visual view of the real system under optimal operation.

Grouping items by classes, and displaying the fluid state as a function of time presents a visualization of the dynamics of the real system.

The graphic display of the fluid solution comprises plotting of the values of $x_k(t)$ as a function of the time t for each of k=1, ..., K. Different embodiments of our method and apparatus for the control of real systems will entail different embodiments of the graphic display, depending on the type of the real-system. Such embodiments will differ in the way in which the plots for the plurality of buffers k=1, ..., K are put together. The main feature that is novel in this display is the idea of presenting the fluid approximation of the real system as a function of time, and it is common to all such embodiments.

In what follows we describe several preferred embodiments of the graphic display of the fluid solution in detail. We shall describe how these graphic displays are exploited in the control of the real-system in our description of the Fluid Control Stage.

4.1 Graphic Displays for Manufacturing Systems

4.1.1 Graphic Displays for Re-Entrant Line Manufacturing Systems

FIG. 10 illustrates one preferred embodiment of the Graphic Display of the Fluid Solution for a Re-Entrant Line. The Re-Entrant Line is described in FIG. 9 and consists of a production process of 9 production steps, carried out at 3 machines, where the steps are numbered as k=1, ..., 9, the machines are numbered as i=1, ..., 3, and the production process will move each part through the machines in the order 1→2→3→1→2→3→1→2→3→Out. Parts ready for production step k are represented in the fluid-model by fluid buffer k. In the fluid solution $x_k(t)$:k=1, ..., 9, 0<t<T, $x_k(t)$ approximates the number of parts ready for step k processing at the time t.

FIG. 10 demonstrates the Graphic Display of the Fluid Solution in shades of gray, the actual embodiment of the display will be in color. In this graphic display the levels of $x_k(t)$ for the 9 buffers are plotted one above the other, as a function of t. The fluid levels of buffers 1, 4, 7 (1001, 1004, 1007) which belong to machine 1 are colored by shades of Red, the fluid levels of buffers 2, 5, 8 (1002, 1005, 1008) which belong to machine 2 are colored by shades of Green, and the fluid levels of buffers 3, 6, 9 (1003, 1006, 1009) which belong to machine 3 are colored by shades of Blue.

Some further explanations of FIG. 10 follow: The fluid level in buffer 1, 1001 is seen to decrease at first, 1009, and then to increase, 1010. This indicates that the inflow rate into the buffer, which approximates the rate at which parts enter the system, is lower than the rate of outflow in the first period, and is faster than the rate of outflow in the second period. Also, in the first period buffer 2, 1002 is empty, 1011, while in the second period, 1012, it is filling up. This indicates that in the first period the rate of inflow and the rate of outflow in buffer 2 are equal, and so flow out of buffer 1, 1009, 1010, flows directly through buffer 2 into buffer 3, 1011. Input into the system is at the bottom of buffer 1, 1013. Fluid which flows out of buffer 9, 1014, leaves the system, and this corresponds to the completion of production of parts in the real system.

If one views a vertical cut through FIG. 10, at some time t, this cut will show the fluid levels of all the buffers at that time, and it will thus present an approximate view of the distribution of all the items in the system at that time, according to class.

An enhancement of the Graphic Display of the Fluid Solution for a Re-Entrant Line is shown in FIG. 11, which illustrates another preferred embodiment. Here horizontal lines, 1101, are added to the display shown in FIG. 10. These horizontal lines represent the movement of sampled parts (for example each 100'th part that goes through the process). Each of these horizontal lines approximates the movement of the corresponding real part through the real system. While a vertical cut of FIG. 10 or FIG. 11 represents the position of all parts one particular time t, each of the added horizontal lines represents the position of a single part in the system, for the entire time that this part is in the system.

Some further explanations of FIG. 11 follow: Consider the part represented by the line 1102 of FIG. 11. This part enters the system at time 0, 1103, when it is at the bottom of buffer 1. It stay in buffer 1 until all fluid above it flows into buffer 2, and then it moves through buffer 2 (which is empty) into buffer 3, 1004). Later it moves out of buffer 3 into buffer 4, 1005. At this point one can see that there is no further flow from buffer 3 into buffer 4 for a while (between 1005 and 1006). During the time between 1005 and 1006, flow out of buffer 4 reduces the fluid above the part. Then the part moves on through buffers 4-9, and leaves the system as a completed part at 1007.

Further details of the dynamic performance of the system are also revealed in FIG. 11. At the time 1008, input rate into the system slows down. Then at time 1009 production rates at all the buffers slow down. Then at time 1010 the input rate and the production rates go up again to their levels at the beginning.

An enhancement of the Graphic Display of the Fluid Solution for a Re-Entrant Line is included in a further preferred embodiment, in which the graphic display is incorporated into a Graphic User Interface (GUI). In such a GUI, the decision maker in the system can explore the effect of modifying the movement of individual batches of parts through the system. This is done by the user choosing a line representing the movement of a part, and dragging this line into a different shape. The GUI will then readjust all the other lines representing the other parts accordingly. FIG. 12 illustrates the use of the GUI. Here the same part that we followed in FIG. 11 is expedited through its last steps of production. In comparing FIG. 11 to FIG. 12 it is seen that at the point 1201 this part is expedited ahead of several of those following it, so that it leaves the system at 1202 and the parts that follow it are then delayed 1203.

4.1.2 Graphic Display for Job-Shop Manufacturing Systems

In job shop manufacturing systems there are several manufacturing processes, numbered r=1, . . . , R, and parts manufactured by process r require a total of $K_r$ processing steps, numbered in the order of processing as (r,1), . . . , (r,$K_r$), so parts are classified by (r,k):k=1 . . . , $K_r$, r=1, . . . , R, and the fluid model has buffers (r,k):k=1 . . . , $K_r$, r=1, . . . , R, to represent parts in these steps of production, and $x_{r,k}(t)$ is the fluid level of fluid in buffer (r,k) at time t, which approximates the number of parts in the system which are ready for processing step (r,k) at time t.

The preferred embodiment of the Graphic Display of the Fluid Solution for a Job Shop manufacturing system displays $x_{r,k}(t)$:(r,k):k=1..., $K_r$, r=1,..., R as a function of t for 0<t<T, by plotting for each r=1, . . . , R the $K_r$ buffers of the r'th process, where each of these R displays is similar to the display of a Re-Entrant Line manufacturing system.

4.2 Graphic Displays for Traffic Control Systems

In a traffic control system the fluid buffers of the fluid model system are associated with locations, so that $x_{k,l}(t)$ is the amount of fluid which approximates the number of vehicles which at time t are located at locations k, and have destination l.

One preferred embodiment to obtain visual displays of the traffic system from the fluid levels of the buffers, is as follows: Define a directed cut of the system as a line which divides the map of the city into two parts, where one part is the source side of the cut and the other part is the destination side of the cut. For a plurality C of such directed cuts, let c∈C denote a particular directed cut. Then one can calculate the sum $y_c(t)$ of all the fluids $x_{k,l}(t)$ in buffers such that k is in the source side of the cut, and l is in the destination side of the cut, and one can then plot $y_c(t)$ against time.

Another embodiment is to consider a direction of travel across the system, and choose several parallel cuts which are perpendicular to this directions, numbered d=0, 1, . . . , D. Let $y_d(t)$ be the volume of fluid in the section d−1, d with destination in d, . . . , D. The graphic display is a plot of $y_1(t)$, . . . , $y_D(t)$ one above the other, as a function of t.

4.3 Graphic Displays for Multiproject Scheduling

Here it is often of interest to plot the fluid levels of various buffers which use a particular resource, for each of the resources.

5 The Fluid Control Stage

We describe the control of the real system by means of the optimal fluid solution and the fluid graphic display. We include several preferred embodiments. These include the use of the graphic display for design, planning, forecasting, performance evaluation, and hierarchical control, the use of the fluid solution for hierarchical control, and the use of the fluid solution for full control of the system, including full closed loop control.

5.1 Control by Means of the Graphic Display

The graphic display presents a complete overview of the optimal behavior of the system over the time horizon. It can be used for design, planning, forecasting, performance evaluation, and hierarchical control, as follows:

Design: The real-system designer can explore the effect of various changes in the system design by modeling the system according to the new design, formulating the fluid problem for the new design, solving and displaying the solution and observing the effect of the new design on the fluid solution. This will be used in assessing alternative designs and in creating the best design.

Planning: The real-system planner can explore the effect of various changes in the operation of the system over the time horizon, by exploring various choices of the real-system exogenous input, output, resource levels and timing decisions. For a choice of planned exogenous input, planned output, planned resource levels, and planned timing decisions, the planner can formulate the fluid problem, solve and display the fluid solution, and observe the effect of various plans on the fluid solution. This will be used to plan the operation of the system. A few embodiments of this are:

In a manufacturing system, assess the choice of timing in introducing new products, of introducing new machines, of working more shifts, of scheduling preventive maintenance and similar choices.

In multiproject systems, assess changes in the allocation of resources which are used by several activities, and which are used in conjunction with other resources. Assess acceleration of some some activities.

In traffic control, assess alternative routings of traffic.

In economic input output systems, assess the effects of changes in the pricing of assets.

Forecasting and Performance Evaluation: The fluid view of the whole system allows the system manager to forecast quantities and timing, and to estimate performance measures. A few embodiments of this are:

In a manufacturing system, predict delivery dates of individual batches. Locate bottlenecks in the process at various times. Assess system performance by estimating from the fluid solution and the fluid display average cycle times, average inventory levels, utilization of machines, and due date adherence.

In multiproject systems, predict completion times of projects, observe scarce resources and timing of scarcity.

In traffic control, predict the volume of traffic, predict location and timing of congestion, evaluate average travel times.

In economic input output systems, predict the levels of assets as a function of time and estimate total rewards.

5.2 Hierarchical Control

The fluid solution and the fluid display can be used in hierarchical control: The fluid solution of the full system is disseminated to several controllers distributed around the system, and each controller controls its own part of the system, according to targets set by the fluid solution of the full system. Preferred embodiments of hierarchical control include:

Hierarchical control of manufacturing systems: The fluid solution is used to assign production targets for items of various classes at each machine. The floor shop operator of each machine plans, controls, and executes the operation of the machine, so as to adhere to these centrally set fluid targets.

Hierarchical traffic control: The fluid solution is used to evaluate the traffic flow rates through each intersection. These fluid flow rates are disseminated to the controllers of each intersection, and the traffic signals at each intersection are operated locally, with the centrally determined fluid traffic flow rates as targets.

5.3 Fluid Tracking Control

The preferred embodiment of a fluid tracking control comprises the following steps:

Record at any time t the target cumulative fluid flows:

$$u_j^+(t) = \int_0^t u_j(s)ds, \quad j = 1, \ldots, J,$$

Record at any time t the actual cumulative rates of actions:
$U_j^+(t)$=number of applications of action j from time 0 to time t
Prioritize next action by:

$$\frac{u_j^+(t) - U_j^+(t)}{u_j^+(t)}$$

Perform feasible action with highest priority.

5.4 Closed Loop Feedback Control

A preferred embodiments of closed loop control is by an apparatus which monitors the system, calculates fluid solution, and controls the system accordingly. The system is monitored by sensing devices of the apparatus in continuous time or at regular intervals, where the sensing apparatus can be measurement instruments, or the monitoring can done by access to existing data bases of the system. The monitored information is used as data for formulation of a fluid problem, at regular time intervals of predetermined length S. The SCLP fluid optimization problem is solved for a rolling time horizon, of predetermined length T, where T>S. The apparatus then controls the system, through control devices, using a Fluid Tracking control which follows the fluid solution for the interval of length S, until a new fluid solution is calculated.

CONCLUSION

I have described methods and apparatus for the control of a system over time, where the system comprises many items, by means of optimizing a conceptual fluid-model which approximates the items of the system by a fluid. I have described an algorithm for the solution of Separated Continuous Linear Programming problems, which can be used by my methods and apparatus for the optimization of the conceptual fluid-model. I have described graphical display of the optimal solution of the fluid-model as a means for visualizing the behavior of the system as an aid to the system operator and decision maker. I have discussed means for using the optimal fluid solution to control the real-system.

I have described several embodiments of my methods and apparatus, for several types of systems, from diverse areas of application such as manufacturing, communication, vehicle transportation, project control, supply chain management, and economic input output systems. I further claim the use of my method for the control of any systems which operate over time and which can be approximated by a fluid model.

My algorithm for the solution of SCLP problems is based on a concise finite representation of optimal solutions by means of a finite ordered sequence of adjacent linear programming bases, where the same sequence of bases also represents the optimal solution for a range of problems parameterized by some parameter of the problem data. Many other variants of algorithms for the solution of Continuous Linear Programming problems can be devised by small changes of my algorithm. It is clear that such variants, using obvious modifications and small changes, can be implemented by anyone having ordinary skill in the field of optimization, and such versions and different embodiments in so far as they are used in methods and apparatus as described here, or similar applications, are therefore also claimed by my invention.

While the present inventor has constructed a new method for solving SCLP problems, it is to be understood that the claims of this invention relate only to the applications of this novel method to such problems which model real technological, industrial, or economic systems, where the solution of the SCLP problem is used as a means of improving the operation of the systems, and increasing the benefits obtained from the system. All other uses of the new method, such as computation research, algorithm research, linear programming research, and optimization theory research activities form no part of the present invention. Similarly, uses of the new method in non-technological, or non-industrial, or non-economic systems likewise form no part of the present invention.

Having described the invention, what I claim is:

1. An apparatus for optimizing the performance of a controlled system over a plurality of times, said apparatus comprising:

a plurality of process control devices for controlling said controlled system in response to control signals from the apparatus, a plurality of sensors for sensing variable conditions of the controlled system by the apparatus, a means for modeling said controlled system by a conceptual fluid-model, a means for calculating optimal control signals for the control of said controlled system, wherein said controlled system comprises a plurality of discrete items, a plurality of actions, and a plurality of resources, where at each of said times each of said items is in one of a plurality of classes, and where application of one of said actions to one of said items in one of said classes at one of said times will change the class of the item, and where said application of one of said actions to one of said items at one of said times will consume some of said resources, and wherein the control of the said controlled system comprises the timing of said actions and the allocation of said resources to said actions, and wherein said means of the apparatus for modeling said controlled system by a conceptual fluid-model comprise:

a plurality of state functions that denote levels of fluids in buffers as a function of time, where the fluid in a buffer at time t approximates the number of items in a corresponding class in the controlled system around the time t, and a plurality of control functions that denote flow rates as a function of time, where a flow rate at time t represents the number of applications of a corresponding action in the controlled system system around the time t, and a linear relationship between the flow rates and the rates of change of the state of the fluid-model system at time t, and a linear relationship between the flow rates of the fluid-model system at time t and the rate of consumption of resources, and wherein said means of the apparatus for calculating optimal control signals comprise an algorithm for a solution of separated continuous linear programming problems, and wherein the operation of the apparatus comprises the repeated applications of the steps:
(a) setting current-time to 0, and setting time-horizon to a predetermined value T, and using the apparatus sensing devices to
sensing current-state of the controlled system, and
sensing the predicted exogenous inputs into the controlled system over the time horizon, and
sensing the predicted levels of available resources over the time horizon, and sensing the predicted rates of reward, per item in each class, and per action, over the time horizon,
and formulating a separated continuous linear programming optimization problem for the fluid-model system from the sensed data of the controlled system,
(b) solving said separated continuous linear programming optimization problem, by an algorithm comprising a sequence of iterations, each of said iterations comprising
a current solution valid in a current validity range, and
an updated solution valid in an updated validity range, and
a calculation of the updated solution from the current solution, said calculation comprising the steps of:
solving a linear programming problem relating to rates, and
determining if a need for solving a sub-problem exists, and
if the need exists then:
formulating the sub-problem, and
solving the sub-problem by a recursive call to a version of the algorithm,
to obtain a fluid solution, comprising the optimal values of the controls of the fluid system and the optimal values of the states of the fluid system for all the times from 0 to T,
(d) producing control signals for controlling the real system in accordance with the optimal solution of the fluid-model system,
where the repeated application of the steps (a), (b), and (c) is performed at a plurality of predetermined decision times.

2. A method for optimizing a real system, said system comprising a plurality of state functions which describe the state of the system as a functions of time, and a plurality of control functions which enable the control of the system over time, said method providing a means for determining values of the control functions over time and of the state functions over time, wherein the control functions and the state functions are subject to linear relations over time and satisfy linear resource constraints over time, and rewards of the system are linear functions of the controls and of the states over time, so that the problem of determining the said values of the control and state functions can be formulated as a separated continuous linear programming problem, the method comprising:
formulating said separated continuous linear programming problem,
solving said separated continuous linear programming problem and determining said control functions over time and said state functions over time,
implementing said control functions over time and said state functions over time to operate the system,
wherein solving the formulated separated continuous linear programming problem is achieved by an algorithm comprising:
solving a parametric range of problems,
starting from an optimal solution of an initial separated continuous linear programming problem at the beginning of the whole parameter range,
terminating with an optimal solution of the formulated separated continuous linear programming problem at the end of the whole parameter range,
performing one or more iterations where each successive iteration provides solutions for a successive range of values of the parameter,
wherein the algorithm is characterized by representing the solution for a range of values of the parameter by means of a concise description, comprising:
a finite sequence of adjacent bases, denoted by $B_1, \ldots, B_N$, where these bases determine the values of the controls in successive adjacent intervals of time from 0 to the time horizon T,
a set of equations to determine the breakpoint times $0=t_0<t_1<\ldots<t_N=T$ between said successive adjacent intervals of time,
wherein the equations change smoothly with the change in the value of the parameter,
and each of the iterations of the algorithm comprising
starting from a solution for a value of the parameter given by a particular sequence of bases $B_1, \ldots, B_N$, then
determining the boundaries of a first range of parameter values for which the same sequence of bases $B_1, \ldots, B_N$ determines the solutions, then
using the solution for the value of the parameter at one of the boundaries of said first range of parameter values to determine:
0 or 1 or more than 1 bases that need to be deleted from the sequence of bases $B_1, \ldots, B_N$, and
0 or 1 or more than 1 bases that need to be inserted in the sequence of bases $B_1, \ldots, B_N$,
and then eliminating and inserting said bases, to obtain a new sequence of bases, which describes the solutions for a second range of values of the parameter which is adjacent to the first range.

* * * * *